US008482588B2

(12) United States Patent
Miyadera et al.

(10) Patent No.: US 8,482,588 B2
(45) Date of Patent: Jul. 9, 2013

(54) OPTICAL WRITING DEVICE, IMAGE FORMING APPARATUS, AND METHOD AND PROGRAM PRODUCT FOR CONTROLLING OPTICAL WRITING DEVICE

(75) Inventors: Tatsuya Miyadera, Osaka (JP); Kunihiro Komai, Osaka (JP); Izumi Kinoshita, Hyogo (JP); Yoshinori Shirasaki, Osaka (JP); Takeshi Shikama, Osaka (JP); Takuhei Yokoyama, Osaka (JP); Akinori Yamaguchi, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 74 days.

(21) Appl. No.: 13/230,104

(22) Filed: Sep. 12, 2011

(65) Prior Publication Data
US 2012/0062681 A1 Mar. 15, 2012

(30) Foreign Application Priority Data

Sep. 15, 2010 (JP) ................................ 2010-206782

(51) Int. Cl.
*B41J 2/385* (2006.01)
*B41J 2/435* (2006.01)
*B41J 2/47* (2006.01)

(52) U.S. Cl.
USPC ............ 347/234; 347/116; 347/229; 347/248

(58) Field of Classification Search
USPC ................. 347/116, 229, 234, 235, 238, 240, 347/248–251, 253, 254
See application file for complete search history.

(56) References Cited

U.S. PATENT DOCUMENTS

| 7,843,604 | B2* | 11/2010 | Higashiyama et al. | ........ 358/1.9 |
| 7,898,695 | B1* | 3/2011 | Damon et al. | ............... 358/3.26 |
| 2006/0226338 | A1* | 10/2006 | Tojima et al. | ............... 250/208.1 |
| 2011/0043592 | A1 | 2/2011 | Kinoshita et al. | |

FOREIGN PATENT DOCUMENTS

| JP | 2002-94764 | 3/2002 |
| JP | 3381582 | 12/2002 |
| JP | 2007-90620 | 4/2007 |
| JP | 2009-27683 | 2/2009 |

OTHER PUBLICATIONS

U.S. Appl. No. 13/224,987, filed Sep. 2, 2011, Kinoshita, et al.

* cited by examiner

*Primary Examiner* — Hai C Pham
(74) *Attorney, Agent, or Firm* — Oblon, Spivak, McClelland, Maier & Neustadt, L.L.P.

(57) ABSTRACT

An optical writing device that forms an electrostatic latent image on a photoreceptor. The device includes a pixel-information acquiring unit, a line-pixel-information storage unit that stores the acquired pixel information corresponding to a plurality of lines for each main scanning line, a light source device that exposes the photoreceptor with a period corresponding to an N-fold sub-scanning direction resolution of the pixel information, a positional-shift-information storage unit that stores a positional shift information, a sub-line counting unit that counts a sub-line period, a reading-line selecting unit that performs N times of selection that determines which main scanning line is selected as the line from which the pixel information is read out, on the basis of a calculated value from the counted value of the sub-line period and the positional shift information, and a pixel-information reading unit.

14 Claims, 13 Drawing Sheets

OPTICAL WRITING DEVICE, IMAGE FORMING APPARATUS, AND METHOD AND PROGRAM PRODUCT FOR CONTROLLING OPTICAL WRITING DEVICE

CROSS-REFERENCE TO RELATED APPLICATIONS

The present application claims priority to and incorporates by reference the entire contents of Japanese Patent Application No. 2010-206782 filed in Japan on Sep. 15, 2010.

BACKGROUND OF THE INVENTION

1. Field of the Invention

The present invention relates to an optical writing device, an image forming apparatus, a method and program for controlling the optical writing device, and a recording medium, and more particularly, to skew correction of an image while suppressing degradation of the image quality.

2. Description of the Related Art

Recently, digitization of information tends to be promoted, and image forming apparatuses, like printers and facsimile machines used for output of digitized information and scanners used for digitization of documents, have become essential apparatuses. Many image forming apparatuses include imaging functions, image forming functions, communication functions, and the like, to be configured as multifunction peripherals that are usable as printers, facsimile machines, scanners, and copiers.

Of these image forming apparatuses, electrophotographic image forming apparatuses are widely used as image forming apparatuses used for output of digitized documents. An electrophotographic image forming apparatus forms an electrostatic latent image on a photosensitive element by exposing a photosensitive element, and develops the electrostatic latent image into a toner image using a developer such as toner, and transfers the toner image onto a sheet of paper to output the sheet of paper.

There are several types of optical writing device which exposes a photoreceptor to an optical beam in an electrophotographic image forming apparatus: a laser diode (LD) raster optical system type and a light emitting diode (LED) writing type. The LD raster optical system type of optical writing device includes a light source, which emits a beam to expose a photoreceptor, and a deflector, such as a polygon scanner, for deflecting the emitted beam to scan the entire surface of the photoreceptor; the LED writing type of optical writing device includes an LED array (LEDA) head. In such an optical writing device, the LD raster optical system type has an error due to skew, positional shift, etc. of an f-theta lens and a reflecting mirror; the LED writing type has skew, an installation error, etc. of the LEDA head.

One of problems caused by such an error is skew of a scanning beam, i.e., a problem that a main scanning direction of an optical beam is inclined from an original direction. As a method to correct this skew, there are several methods applicable to both the LD type and the LED type; one of the methods is to mechanically correct the skew, and another method is to deform an image to be output by image processing according to an amount of the skew thereby finally forming a suitable image.

In the method to mechanically correct the skew, correction is achieved by providing an adjustment mechanism which displaces the mounting positions of a mirror and a head in a writing unit in the case of the LD type and the mounting position of the LEDA in the case of the LED type; however, to automatically carry out this adjustment, an actuator, such as a motor, is required, and this results in an increase in cost of the entire device.

On the other hand, in correction by image processing, the skew is corrected in such a manner that pixels composing an image are shifted in a sub-scanning direction at a certain main-scanning direction position. As a method to shift pixels composing an image in the sub-scanning direction, there are several methods: a method to accumulate pixels of respective main scanning lines in line memories with respect to each main scanning line and switch the line memory from which pixels are to be read out according to a main-scanning direction write position thereby shifting the image in the sub-scanning direction and a method to store pixels in a line memory in a state where the pixels are shifted in the sub-scanning direction at a certain main-scanning direction position. In this case, we only have to add a line memory to an image processing unit in accordance with a correction range, so this can be achieved at relatively low cost as compared with the mechanical correction, and also this allows automatic correction, and therefore, this is effective as a method of skew correction.

However, in the method to correct skew by image processing, a change in dither pattern arises at the image shift position. The change in dither pattern changes a relationship of adjacent pixels in the main scanning direction, such as a change from a white pixel to a black pixel, and an area of attachment of toner at the time of output varies. In an image represented by pseudo gradation processing such as a dither method, this variation in area of attachment of toner frequently occurs successively or periodically in the sub-scanning direction and appears as a streaky noise extending in the sub-scanning direction on an image formed on a print sheet.

To cope with such a problem, there is proposed a method to prevent appearance of a streaky noise described above by performing image shift at the position where no dither matrix image pattern exists (for example, see Japanese Patent Application Laid-open No. 2009-27683). Furthermore, there is proposed a method to store information on skew in a storage unit and control the timing to drive each element on the basis of the information (for example, see Japanese Patent Application Laid-open No. H11-70697).

In a case of using the technology disclosed in Japanese Patent Application Laid-open No. 2009-27683, image shift is performed while avoiding an area of dither matrix; therefore, the image shift period has to be at least longer than the area of dither matrix, and the number of correctable lines is limited. Furthermore, this technology cannot be applied to such an image that a dither pattern is expanded over the whole page.

In a case of using the technology disclosed in Japanese Patent Application Laid-open No. H11-70697, a configuration of a circuit for controlling the timing to emit a light with respect to each element is complex, resulting in increases in the circuit size and cost.

Furthermore, in a conventional skew correction method, it is a popular way that a controller of an image forming apparatus performs skew correction and then inputs image data subjected to the skew correction to an optical writing device. In this case, there is individual variability in skew among optical writing devices, so the optical writing device has to input skew information to the controller, and this constrains the design of the optical writing device and the controller.

Moreover, it is uncertain what kind of skew information is input from the optical writing device; therefore, at the time of design of a skew correction function of the controller, it is necessary to design the skew correction function so as to deal with any kind of skew or design the skew correction function to meet skew which has occurred in the optical writing device, and this results in constraints on the design and an increase in cost. Such problems can be resolved by providing a skew correction function to the optical writing device.

SUMMARY OF THE INVENTION

It is an object of the present invention to at least partially solve the problems in the conventional technology.

According to an aspect of the present invention, there is provided an optical writing device that forms an electrostatic latent image on a photoreceptor. The optical writing device includes: a pixel-information acquiring unit that acquires pixel information that is information about pixels that form an image as the electrostatic latent image; a line-pixel-information storage unit that stores the acquired pixel information corresponding to a plurality of lines for each main scanning line; a light source device that exposes the photoreceptor to a light to form the electrostatic latent image, the exposure with the light being performed with a period that corresponds to an N-fold sub-scanning direction resolution, the N-fold sub-scanning direction resolution being an integral multiple of a sub-scanning direction resolution of the pixel information; a positional-shift-information storage unit that stores a positional shift information in a sub-scanning direction that differs depending on a position in a main-scanning direction of the light source device; a sub-line counting unit that counts a sub-line period that corresponds to the N-fold sub-scanning direction resolution; a reading-line selecting unit that selects a main scanning line, as the main scanning line from which the pixel information is read out, that differs depending on the position in the main scanning direction, on the basis of a calculated value from the counted value of the sub-line period and the positional shift information; and a pixel-information reading unit that reads out the pixel information from the selected main scanning line and inputs the read pixel information to the light source device. The reading-line selecting unit performs N times of selection that determines which main scanning line is to be selected as the main scanning line from which the pixel information is read out.

According to an aspect of the present invention, there is provided an image forming apparatus provided with the optical writing device described above.

According to an aspect of the present invention, there is provided a method for controlling an optical writing device including a light source device that exposes a photoreceptor to a light with a period that corresponds to an N-fold sub-scanning direction resolution, the N-fold sub-scanning direction resolution being an integral multiple of a sub-scanning direction resolution of pixel information of an image to be output, thereby forming an electrostatic latent image on the photoreceptor. The method includes: acquiring pixel information that is information about pixels that form an image as the electrostatic latent image; storing the acquired pixel information into a storage medium in such a manner that the pixel information corresponding to a plurality of lines is stored for each main scanning line; acquiring a positional shift value in a sub-scanning direction that differs depending on a position in a main-scanning direction of a light source device, from a positional-shift-information storage unit that stores a positional shift information in the sub-scanning direction that differs depending on the position in the main-scanning direction of the light source device; acquiring a sub-line period count value from a counter that counts the sub-line period that corresponds to the N-fold sub-scanning direction resolution; performing N times of selection that determines which main scanning line is selected as the main scanning line from which the stored pixel information is read out, on the basis of a calculated value from the sub-line period count value and the positional shift information; and controlling light emission of the light source device by reading out the pixel information of the selected main scanning line and inputting the read pixel information to the light source device.

According to an aspect of the present invention, there is provided a computer program product comprising a non-transitory computer-readable medium having computer-readable program codes embodied in the medium for controlling an optical writing device including a light source device that exposes a photoreceptor to a light with a period that corresponds to an N-fold sub-scanning direction resolution, the N-fold sub-scanning direction resolution being an integral multiple of a sub-scanning direction resolution of the pixel information of an image to be output, thereby forming an electrostatic latent image on the photoreceptor. The program codes when executed causing a computer to execute: acquiring pixel information that is information about pixels that form an image as the electrostatic latent image; storing the acquired pixel information into a storage medium in such a manner that the pixel information corresponding to a plurality of lines is stored for each main scanning line; acquiring a positional shift value in a sub-scanning direction that differs depending on a position in a main-scanning direction of a light source device, from a positional-shift-information storage unit that stores a positional shift information in the sub-scanning direction that differs depending on the position in the main-scanning direction of the light source device; acquiring a sub-line period count value from a counter that counts the sub-line period that corresponds to the N-fold sub-scanning direction resolution; performing N times of a selection that determines which main scanning line is selected as the main scanning line from which the stored pixel information is read out, on the basis of a calculated value from the sub-line period count value and the positional shift information; and controlling light emission of the light source device by reading out the pixel information of the selected main scanning line and inputting the read pixel information to the light source device.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings. In the present embodiments, a multifunction peripheral (MFP) is described as an example of an image forming apparatus. The image forming apparatus according to the present embodiments is an electrophotographic MFP, and the gist of the invention is the mode of skew correction made in an optical writing device for forming an electrostatic latent image on a photoreceptor. Incidentally, the image forming apparatus does not have to be an MFP; for example, the image forming apparatus can be a copier, a printer, a facsimile machine, and the like.

Figure 1:
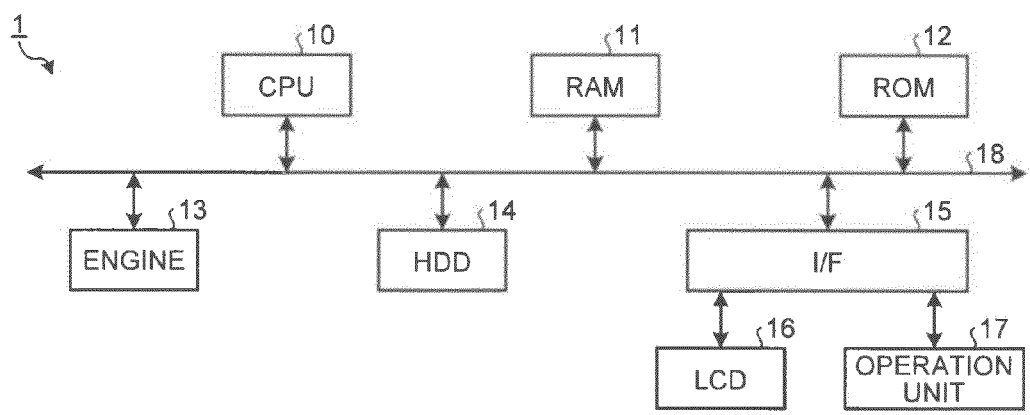
FIG. 1 is a block diagram illustrating a hardware configuration of an image forming apparatus according to an embodiment of the present invention.

FIG. 1 is a block diagram showing a hardware configuration of an image forming apparatus 1 according to an embodiment of the present invention. As shown in FIG. 1, the image forming apparatus 1 according to the present embodiment has an engine for performing image formation in addition to the same configuration as a general server or information processing terminal such as personal computer (PC). Namely, in the image forming apparatus 1 according to the present embodiment, a central processing unit (CPU) 10, a random access memory (RAM) 11, a read-only memory (ROM) 12, an engine 13, a hard disk drive (HDD) 14, and an interface (I/F) 15 are connected to one another via a bus 18. Furthermore, a liquid crystal display (LCD) 16 and an operation unit 17 are connected to the I/F 15.

The CPU 10 is a computing means, and controls the operation of the entire image forming apparatus 1. The RAM 11 is a volatile storage medium capable of high-speed read/write of information, and is used as a work area of the CPU 10 when the CPU 10 processes information. The ROM 12 is a read-only nonvolatile storage medium, and stores therein a program such as firmware. The engine 13 is a mechanism which actually performs image formation in the image forming apparatus 1.

The HDD 14 is a nonvolatile storage medium capable of read/write of information, and stores therein an operating system (OS), various control programs and application programs, and the like. The I/F 15 connects the bus 18 to various hardware and a network, etc., and controls the connection. The LCD 16 is a visual user interface provided to allow a user to check a status of the image forming apparatus 1. The operation unit 17 is a user interface, such as a keyboard and a mouse, provided to allow a user to input information to the image forming apparatus 1.

In such a hardware configuration, a program stored in the ROM 12, the HDD 14, or a recording medium such as an optical disk (not shown) is loaded into the RAM 11, and the CPU 10 performs an operation in accordance with the program, thereby making up a software control unit. A function block which implements functions of the image forming apparatus 1 according to the present embodiment is composed of a combination of the software control unit made up in this way and the hardware.

Figure 2:
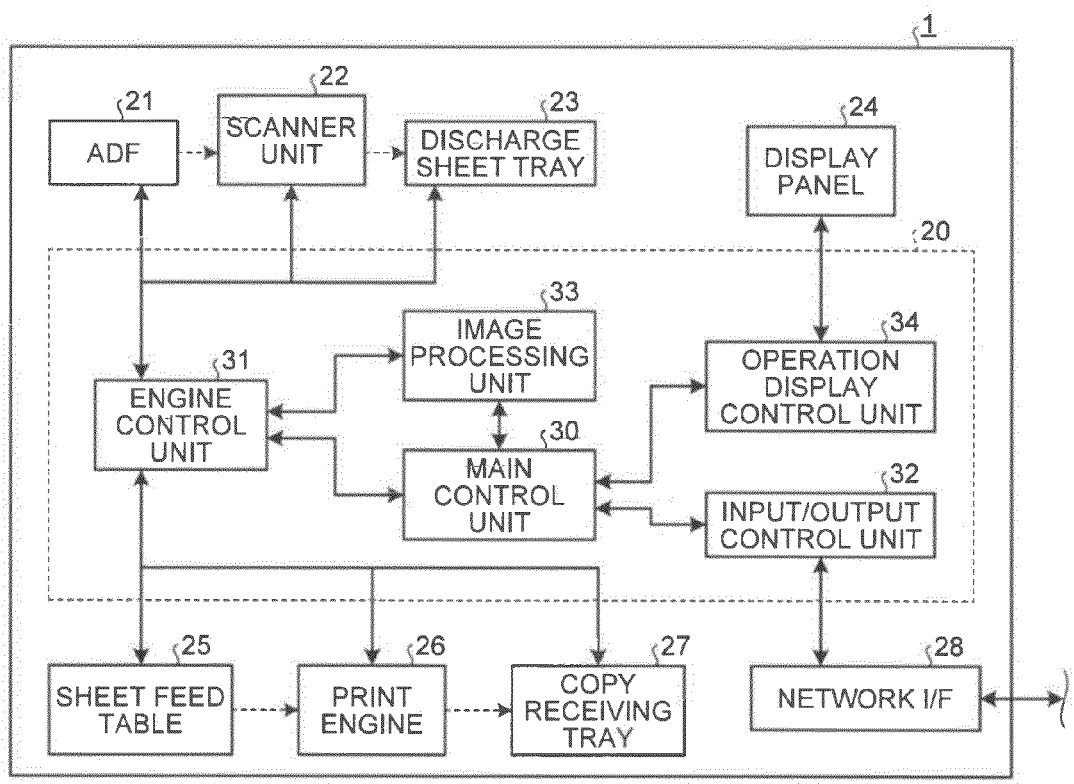
FIG. 2 is a diagram illustrating a functional configuration of the image forming apparatus according to the embodiment of the present invention.

Subsequently, a functional configuration of the image forming apparatus 1 according to the present embodiment is explained with reference to FIG. 2. FIG. 2 is a block diagram showing the functional configuration of the image forming apparatus 1 according to the present embodiment. As shown in FIG. 2, the image forming apparatus 1 according to the present embodiment has a controller 20, an auto document feeder (ADF) 21, a scanner unit 22, a discharge sheet tray 23, a display panel 24, a sheet feed table 25, a print engine 26, a copy receiving tray 27, and a network I/F 28.

The controller 20 includes a main control unit 30, an engine control unit 31, an input/output control unit 32, an image processing unit 33, and an operation display control unit 34. As shown in FIG. 2, the image forming apparatus 1 according to the present embodiment is configured as an MFP having the scanner unit 22 and the print engine 26. Incidentally, in FIG. 2, electrical connections are indicated by solid arrows, and the flow of a sheet is indicated by dashed arrows.

The display panel 24 is an output interface for visually displaying thereon a status of the image forming apparatus 1 and also is an input interface (an operation unit) used as a touch panel when a user directly operates the image forming apparatus 1 or inputs information to the image forming apparatus 1. The network I/F 28 is an interface provided to allow the image forming apparatus 1 to communicate with other devices via a network; an Ethernet (registered trademark) interface or a universal serial bus (USB) interface is used as the network I/F 28.

The controller 20 is composed of a combination of software and hardware. Specifically, control programs, such as firmware, stored in the ROM 12 or a nonvolatile memory and the HDD 14 or a nonvolatile recording medium such as an optical disk are loaded into a volatile memory (hereinafter, referred to as a "memory") such as the RAM 11, and a software control unit made up in accordance with the control of the CPU 10 and hardware, such as an integrated circuit, compose the controller 20. The controller 20 serves as a control unit for controlling the entire image forming apparatus 1.

The main control unit 30 takes a role in controlling the units included in the controller 20, and gives an instruction to each unit in the controller 20. The engine control unit 31 serves as a drive means for controlling or driving the print engine 26, the scanner unit 22, and the like. The input/output control unit 32 inputs a signal or instruction input via the network I/F 28 to the main control unit 30. Furthermore, the main control unit 30 controls the input/output control unit 32 and accesses another device via the network I/F 28.

The image processing unit 33 generates drawing information on the basis of print information included in an input print job in accordance with the control of the main control unit 30. The drawing information is information for the print engine 26, which is an image forming unit, to draw an image to be formed in the image forming operation, and is information on pixels composing an image to be output, i.e., pixel information. Furthermore, the print information included in the print job is image information converted in the form that the image forming apparatus 1 can recognize by a printer driver installed on an information processing apparatus such as a PC. The operation display control unit 34 displays information on the display panel 24 or notifies the main control unit 30 of information input through the display panel 24.

When the image forming apparatus 1 operates as a printer, first, the input/output control unit 32 receives a print job via the network I/F 28. The input/output control unit 32 transfers the received print job to the main control unit 30. When receiving the print job, the main control unit 30 controls the image processing unit 33 and causes the image processing unit 33 to generate drawing information on the basis of print information included in the print job.

When the drawing information has been generated by the image processing unit 33, the engine control unit 31 performs image formation on a sheet fed from the sheet feed table 25 on the basis of the generated drawing information. Namely, the print engine 26 serves as an image forming unit. The sheet on which an image has been formed by the print engine 26 is discharged onto the copy receiving tray 27.

When the image forming apparatus 1 operates as a scanner, in accordance with an instruction to execute scanning made through user operation on the display panel 24 or input from an external device, such as a PC, via the network I/F 28, the operation display control unit 34 or the input/output control unit 32 outputs a scanning execution signal to the main control unit 30. The main control unit 30 controls the engine control unit 31 on the basis of the received scanning execution signal.

The engine control unit 31 drives the ADF 21 to feed an original to be imaged, which has been set in the ADF 21, to the scanner unit 22. Furthermore, the engine control unit 31 drives the scanner unit 22 to take an image of the original fed from the ADF 21. In a case where no original has been set in the ADF 21 and a user directly sets an original in the scanner unit 22, the scanner unit 22 takes an image of the set original in accordance with the control of the engine control unit 31. Namely, the scanner unit 22 serves as an imaging unit.

In the imaging operation, an imaging element, such as a CCD, included in the scanner unit 22 optically scans the original, and imaging information is generated on the basis of optical information. The engine control unit 31 transfers the imaging information generated by the scanner unit 22 to the image processing unit 33. The image processing unit 33 generates image information on the basis of the imaging information received from the engine control unit 31 in accordance with the control of the main control unit 30. The image information generated by the image processing unit 33 is stored in a storage medium mounted in the image forming apparatus 1, such as a HDD 40. Namely, the scanner unit 22, the engine control unit 31, and the image processing unit 33 serve as an original reading unit in cooperation with one another.

The image information generated by the image processing unit 33 is kept in the HDD 40 or the like as it is or is transmitted to an external device via the input/output control unit 32 and the network I/F 28 in accordance with an instruction from a user. Namely, the ADF 21 and the engine control unit 31 serve as an image input unit.

When the image forming apparatus 1 operates as a copier, the image processing unit 33 generates drawing information on the basis of imaging information that the engine control unit 31 has received from the scanner unit 22 or image information generated by the image processing unit 33. In the same manner as in the case of the printer operation, on the basis of the drawing information, the engine control unit 31 drives the print engine 26.

Figure 3:
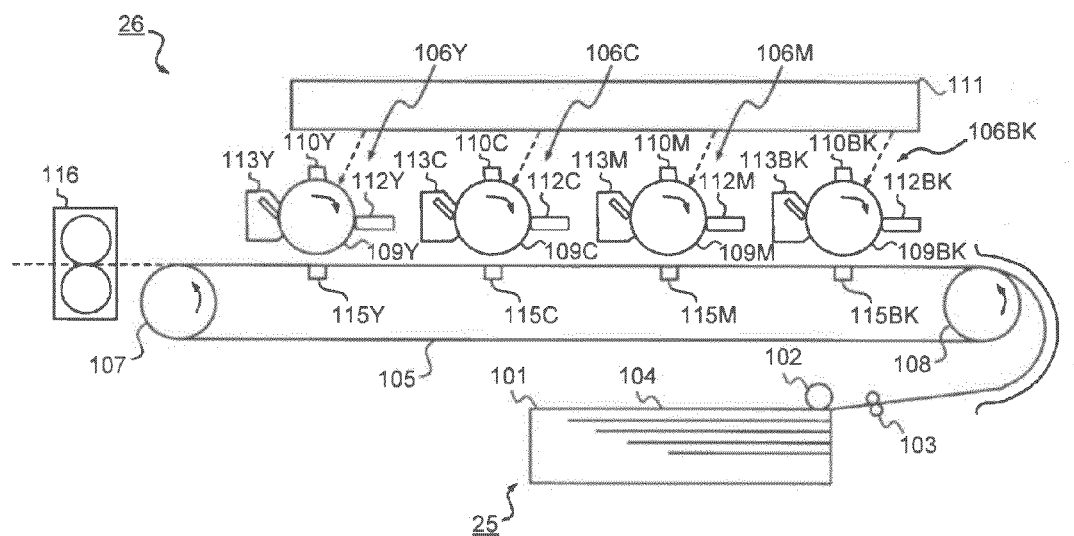
FIG. 3 is a diagram illustrating a configuration of a print engine according to the embodiment of the present invention.

Subsequently, a configuration of the print engine 26 according to the present embodiment is explained with reference to FIG. 3. As shown in FIG. 3, the print engine 26 according to the present embodiment is a so-called tandem type, and has a configuration that a plurality of image forming units 106 for forming different color images are aligned along a conveying belt 105 which is an endless moving body. Namely, a plurality of image forming units (electrophotographic process units) 106BK, 106M, 106C, and 106Y are arranged in this order from the upstream side of the conveying belt 105 in a conveying direction along the conveying belt 105 that conveys a sheet (an example of a recording medium) 104 which has been picked up from a sheet tray 101 one by one and fed by a sheet feed roller 102 and a separation roller 103.

The plurality of image forming units 106BK, 106M, 106C, and 106Y only differ from one another in their colors of toner images to be formed and have the same internal configuration. The image forming unit 106BK forms a black image, the image forming unit 106M forms a magenta image, the image forming unit 106C forms a cyan image, and the image forming unit 106Y forms a yellow image. In the description below, the image forming unit 106BK will be explained specifically, and since the other image forming units 106M, 106C, and 106Y are similar to the image forming unit 106BK, for each element of the image forming units 106M, 106C, and 106Y, a reference numeral distinguished by "M", "C", or "Y" respectively will be used in the drawing in place of "BK" used for each element of the image forming unit 106BK, and explanation thereof will be omitted.

The conveying belt 105 is an endless belt supported by a drive roller 107, which is driven to rotate, and a driven roller 108. The drive roller 107 is driven to rotate by a drive motor (not shown). The drive motor, the drive roller 107, and the driven roller 108 serve as a drive means for driving the conveying belt 105, which is an endless moving body, to move.

In image formation, the top sheet 104 of those contained in the sheet tray 101 is sequentially fed, and attracted to the conveying belt 105 by the electrostatic attraction and conveyed to the first image forming unit 106BK in accordance with the rotation of the conveying belt 105, and in the image forming unit 106BK, a black toner image is transferred onto the sheet 104 being conveyed on the conveying belt 105. Namely, the conveying belt 105 serves as a conveying body for conveying a sheet onto which an image is to be transferred.

The image forming unit 106BK is composed of a photosensitive drum 109BK as a photoreceptor and a charger 110BK, an optical writing device 111, a developing unit 112BK, a photoreceptor cleaner (not shown), and a static eliminator 113BK which are arranged around the photosensitive drum 109BK, and the like. The optical writing device 111 is configured to expose the photosensitive drums 109BK, 109M, 109C, and 109Y (hereinafter, collectively referred to as "photosensitive drum(s) 109") to lights, thereby forming electrostatic latent images on the photosensitive drums 109, respectively.

In the image formation, the outer circumferential surface of the photosensitive drum 109BK is uniformly charged by the charger 110BK in the dark, and then exposed to an irradiation light corresponding to a black image which is emitted from the optical writing device 111, and an electrostatic latent image is formed on the photosensitive drum 109BK. The developing unit 112BK develops the electrostatic latent image into a visible image using black toner, and a black toner image is formed on the photosensitive drum 109BK.

The toner image is transferred onto the sheet 104 at the position where the photosensitive drum 109BK and the sheet 104 on the conveying belt 105 come in contact with each other (the transfer position) by the action of a transfer unit 115BK. As a result, an image formed of the black toner is formed on the sheet 104. After the transfer of the toner image onto the sheet 104, unwanted toner remaining on the outer circumferential surface of the photosensitive drum 109BK is removed by the photoreceptor cleaner, and static electricity is eliminated from the outer circumferential surface of the photosensitive drum 109BK by the static eliminator 113BK to make the photosensitive drum 109BK ready for next image formation.

The sheet 104 onto which the black toner image has been transferred by the image forming unit 106BK as described above is conveyed to the next image forming unit 106M by the conveying belt 105. In the image forming unit 106M, by the same process as the image forming process performed in the image forming unit 106BK, a magenta toner image is formed on the photosensitive drum 109M, and the toner image is transferred onto the sheet 104 so that the magenta toner image is superimposed on the black image formed on the sheet 104.

The sheet 104 is further conveyed to the next image forming units 106C and 106Y, and by the same operation, a cyan toner image formed on the photosensitive drum 109C and a yellow toner image formed on the photosensitive drum 109Y are transferred onto the sheet 104 superimposed onto one another. In this manner, a full-color image is formed on the sheet 104. The sheet 104 on which the full-color superimposed image has been formed is separated from the conveying belt 105, and the image is fixed on the sheet 104 by a fixing unit 116, and after that, the sheet 104 is discharged to the outside of the image forming apparatus.

Figure 4:
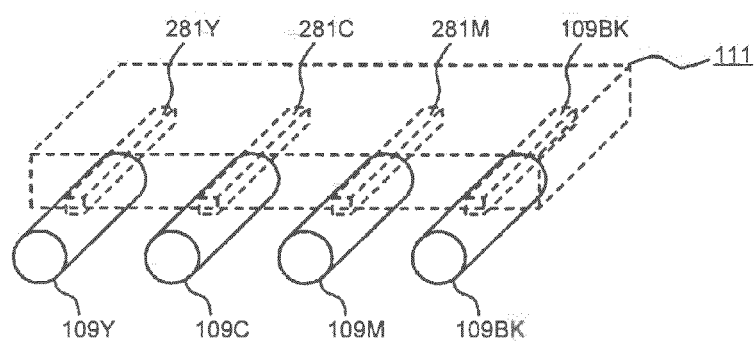
FIG. 4 is a diagram schematically showing a configuration of an optical writing device according to an embodiment of the present invention.

Subsequently, the optical writing device 111 according to the present embodiment is explained. FIG. 4 is a diagram showing the arrangement of the optical writing device 111 according to the present embodiment and the photosensitive drums 109. As shown in FIG. 4, irradiation lights to be irradiated to the photosensitive drums 109BK, 109M, 109C, and 109Y are emitted from LED arrays (LEDAs) 281BK, 281M, 281C, and 281Y (hereinafter, collectively referred to as "LEDA 281") which are light sources, respectively.

The LEDA 281 is composed of a plurality of LEDs which are light-emitting elements, and the LEDs are aligned in the main scanning direction of the photosensitive drum 109. A control unit included in the optical writing device 111 controls the on/off of light emission of each of the LEDs aligned in the main scanning direction with respect to each main scanning line on the basis of data of an image to be output, thereby selectively exposing the surface of the photosensitive drum 109 to an irradiation light and forming an electrostatic latent image on the photosensitive drum 109.

Namely, the LEDA 281 forms an electrostatic latent image corresponding to one main-scanning direction line of an image to be output with every light emission on/off control. In such an optical writing device, if there is an installation error of the LEDA 281, a tilted image is formed, i.e., a so-called skew occurs. Specifically, an electrostatic latent image is formed by exposure of the photosensitive drum 109 to a light emitted from the LEDA 281; therefore, if the direction of alignment of the LEDs in the LEDA 281 is tilted with respect to the main scanning direction of the photosensitive drum 109, the electrostatic latent image is also tilted in accordance with the tilt of the LED alignment. Then, the tilted electrostatic latent image is developed, and a tilted image is formed. To perform correction to prevent the occurrence of skew is the gist of the present embodiment.

Figure 5:
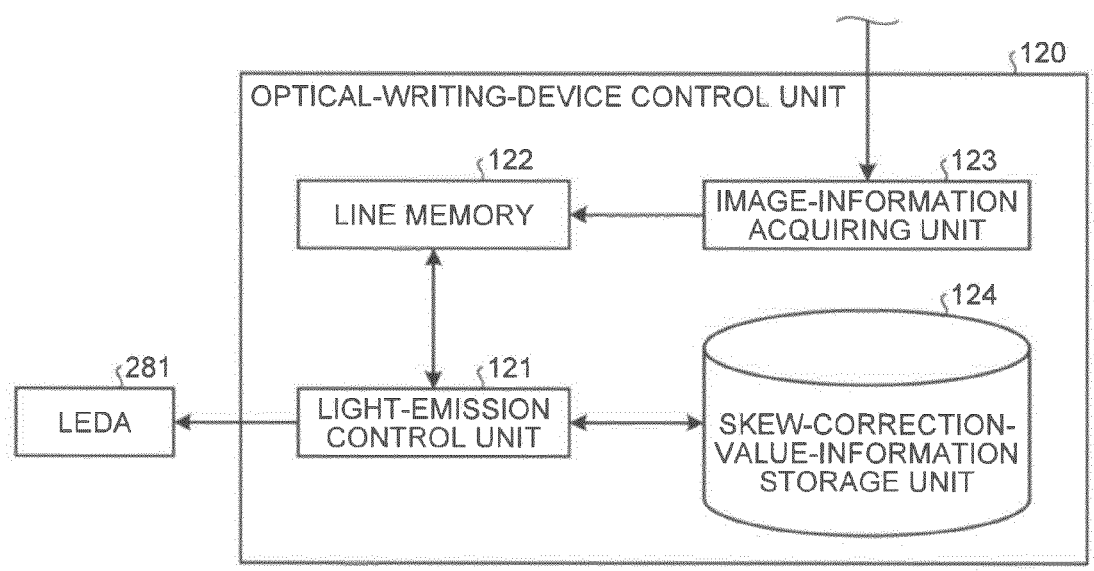
FIG. 5 is a block diagram showing a control unit of the optical writing device according to the embodiment of the present invention.

Subsequently, a control block of the optical writing device 111 according to the present embodiment is explained with reference to FIG. 5. FIG. 5 is a diagram showing a functional configuration of an optical-writing-device control unit 120 for controlling the optical writing device 111 according to the present embodiment and a relation of connection between the optical-writing-device control unit 120 and the LEDA 281. As shown in FIG. 5, the optical-writing-device control unit 120 according to the present embodiment includes a light-emission control unit 121, a line memory 122, an image-information acquiring unit 123, and a skew-correction-value-information storage unit 124.

Incidentally, the optical writing device 111 according to the present embodiment includes an information processing mechanism like the CPU 10, the RAM 11, and a storage medium such as the ROM 12 as described in FIG. 1, and in the same manner as the controller 20 of the image forming apparatus 1, the optical-writing-device control unit 120 as shown in FIG. 5 is composed of a combination of a software control unit, which is made up in such a way that a control program stored in the storage medium such as the ROM 12 is loaded into the RAM 11 and the CPU 10 performs an operation in accordance with the program, and hardware.

The light-emission control unit 121 is a light-source control unit which controls light emission of the LEDA 281 on the basis of pixel information stored in the line memory 122 based on image information input from the engine control unit 31 of the controller 20. The light-emission control unit 121 controls the light-emission on/off control of the light-emission control unit 121 with respect to each scanning line in accordance with a sub-scanning direction clock. The control of the sub-scanning direction clock is one of the gists of the present embodiment.

The line memory 122 is a storage medium for storing therein pixel information of each main scanning line of an image based on image information input from the engine control unit 31. Namely, the line memory 122 serves as a line-pixel-information storage unit. The light-emission control unit 121 reads out pixel information stored in the line memory 122 line by line, and controls the light-emission on/off control of the LEDA 281.

Figures 6, 7:
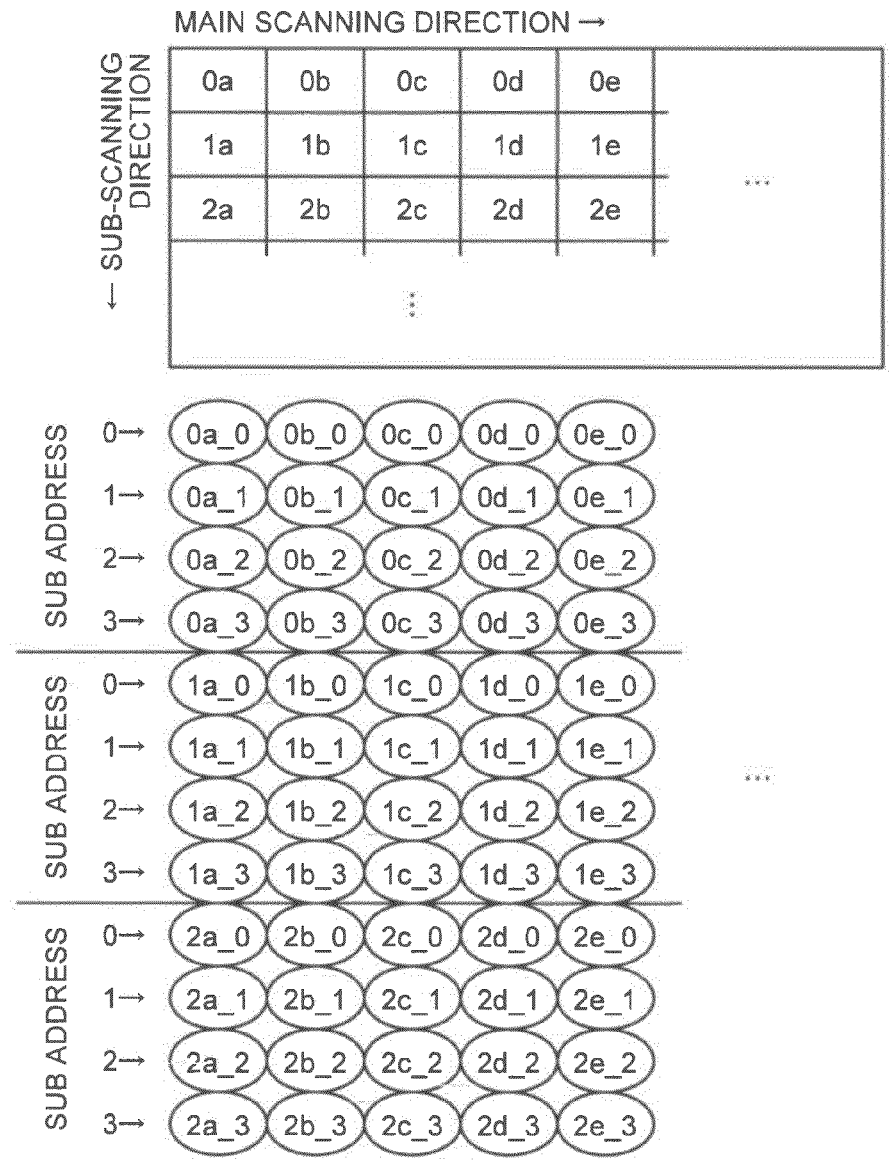
FIG. 6 is a diagram showing a relation between pixel information stored in a line memory and pixels to be output according to the embodiment of the present invention.
FIG. 7 is a diagram showing an example of information stored in a skew-correction-value-information storage unit according to the embodiment of the present invention.

FIG. 6 is a diagram showing a relation between the reading order of pixel data stored in the line memory 122 and an actually-drawn image. The upper part of FIG. 6 is a diagram showing the reading order of pixel data stored in the line memory 122, and pixel data stored in the line memory 122 is sequentially read in the order of "0a", "0b", "0c", . . . as for the pixel data of the first line, "1a", "1b", "1c", . . . as for the pixel data of the second line, "2a", "2b", "2c", . . . as for the pixel data of the third line, and so on. The lower part of FIG. 6 is a diagram showing an example of an image to be drawn on the basis of the pixel data read out from the line memory 122, and pixels to be drawn corresponding to the pixel data of each line are circled.

In the present embodiment, as shown in FIG. 6, pixel data of each main scanning line is divided into four lines for drawing. In other words, the light-emission control unit 121 controls the light-emission on/off control of the LEDA 281 with a period corresponding to four times as higher resolution as the sub-scanning direction resolution of image data input to the optical-writing-device control unit 120. Incidentally, in the present embodiment, there is described an example in which the sub-scanning direction resolution is quadrupled and each main scanning line is divided into four; however, a multiplying factor of the resolution and a division number of each main scanning line can be three or less or can be five or more. Hereinafter, the multiplying factor of the resolution and the division number of line are generally denoted by "N".

As shown in FIG. 6, the light-emission control unit 121 divides an area of each pixel in the sub-scanning direction into four sub-lines, and controls the light-emission on/off control of the LEDA 281 sub-line by sub-line thereby drawing a sub-pixel. At this time, the light-emission control unit 121 selects pixel information stored in the line memory 122 on a per-main scanning line basis N times per main scanning line. Sub-lines and sub-pixels are identified by sub addresses from "0" to "3", such as "$0a\_0$", "$0a\_1$", "$0a\_2$", and "$0a\_3$". The light-emission control unit 121 controls the light-emission on/off control of the LEDA 281 while counting sub-lines in drawing of one main scanning line. Namely, the light-emission control unit 121 stores therein a sub-line count value.

Incidentally, in FIG. 6, for ease of the diagram, one pixel composed of four sub-pixels, such as "$0a\_0$" to "$0a\_3$", is depicted as a pixel of which the size in the sub-scanning direction is longer than the main scanning direction size; however, a ratio of the main scanning direction size to the sub-scanning direction size of an actual pixel is 1 to 1.

The image-information acquiring unit 123 acquires image information (drawing information described above) input from the controller 20, and stores information on pixels composing the image in the line memory 122 on a per-main scanning line basis. Namely, the image-information acquiring unit 123 serves as a pixel-information acquiring unit.

The skew-correction-value-information storage unit 124 is a positional-shift-information storage unit for storing therein information on a skew correction amount, i.e., a shift amount which is a value of positional shift in the sub-scanning direction over the entire main scanning line as shown in FIG. 7. Incidentally, "a", "b", "c", . . . in FIG. 7 correspond to "a", "b", "c", . . . in FIG. 6. Incidentally, in the present embodiment, it is assumed that a skew correction amount of each pixel shown in FIG. 7 is not greater than a value of above-described "N".

In the present embodiment, when the light-emission control unit 121 reads out pixel information from the line memory 122, skew correction is performed by reading out the pixel information with pixels shifted in the sub-scanning direction on the basis of information stored in the skew-correction-value-information storage unit 124. The basic concept of the skew correction is explained with reference to FIGS. 8 and 9.

Figure 8:
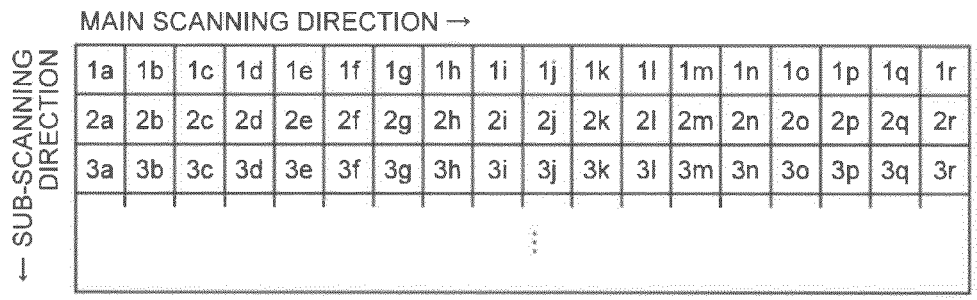
FIG. 8 is a diagram showing the concept of skew correction according to the embodiment of the present invention.
Figure 8:
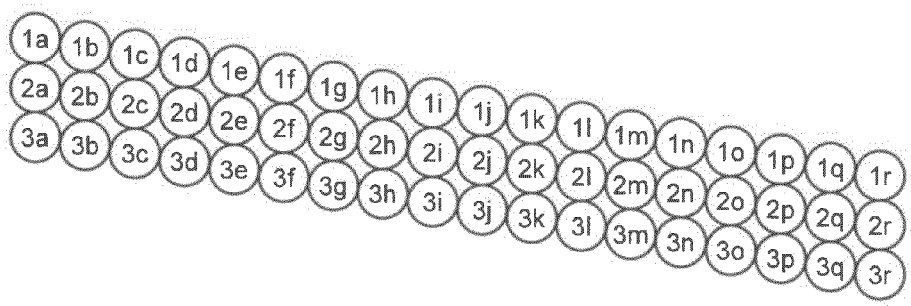

FIG. 8 is a diagram showing a relation between pixel data read out from the line memory 122 and an actually-drawn image in the same manner as FIG. 6, and is a diagram showing a state of an image on the occurrence of skew. In an example shown in FIG. 8, an image is tilted upward to the left in the diagram due to skew of optical beams.

Figure 9:
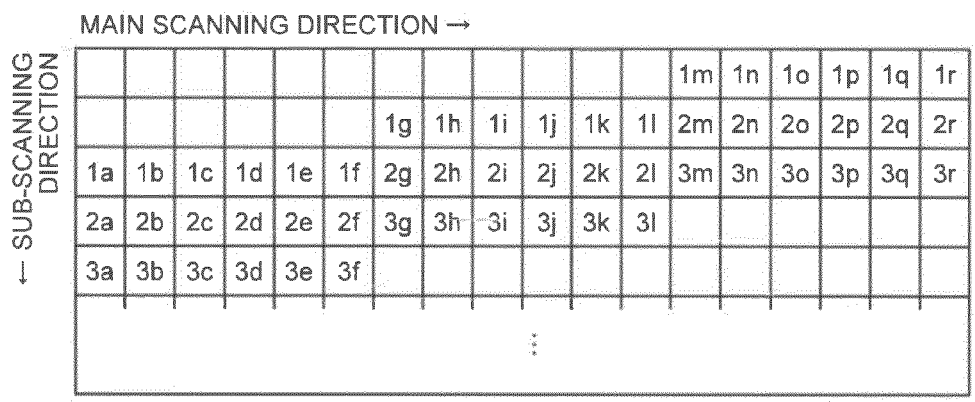
FIG. 9 is a diagram showing the concept of skew correction according to the embodiment of the present invention.
Figure 9:
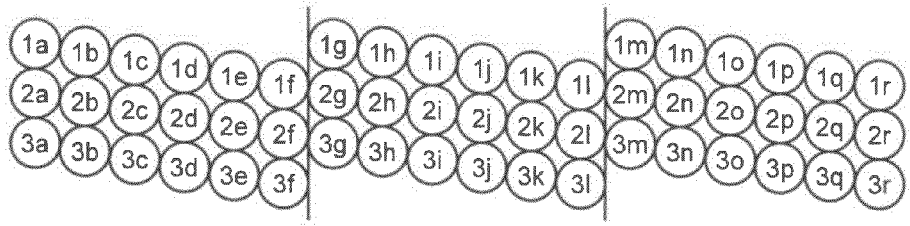

FIG. 9 is a diagram showing a state of an image of which the skew shown in FIG. 8 is corrected. In an example shown in FIG. 9, pixel data to be read out from the line memory 122 is shifted in the sub-scanning direction every six pixels as shown in the upper part of FIG. 9. As a result, as shown in the lower part of FIG. 9, an overall shift amount due to the skew is reduced. Incidentally, in the examples shown in FIGS. 8 and 9, for ease of explanation, each of pixels output with respect to each pixel data is circled.

Figure 10A:
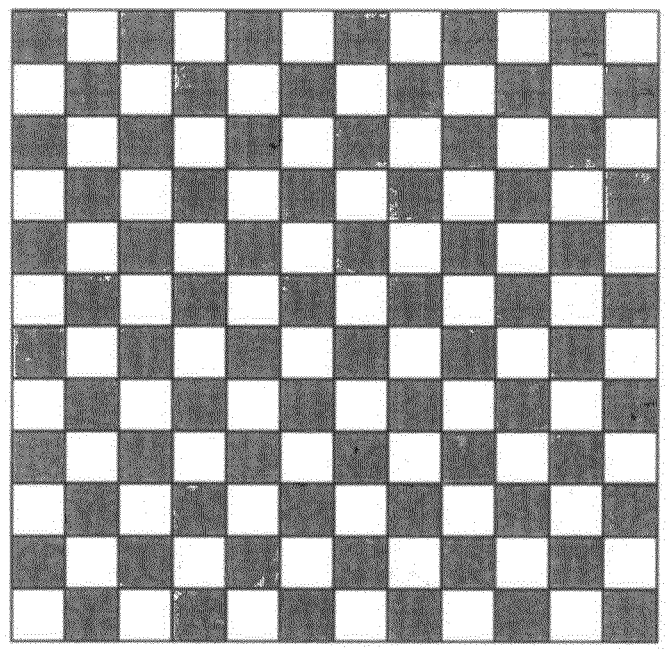
FIGS. 10A and 10B are diagrams showing a problem resolved by the skew correction according to the embodiment of the present invention.
Figure 10B:
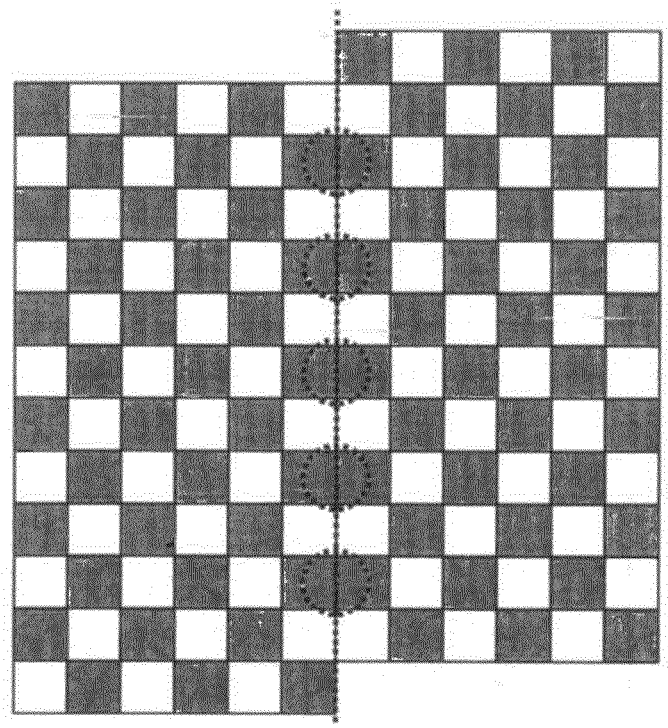

Subsequently, the negative effect caused by skew correction as shown in FIG. 9 is explained with reference to FIGS. 10A and 10B. FIGS. 10A and 10B are diagrams showing an example where shift correction is performed on an image dithered every other pixel in the main scanning direction and the sub-scanning direction; FIG. 10A shows the image before the correction and FIG. 10B shows the image after the correction. In FIG. 10B, the image is shifted at the position indicated by a bold dotted line.

When the same correction as FIG. 9 is performed as shown in FIG. 10B, a dither pattern is formed every other pixel, so as indicated by dotted circles in FIG. 10B, at the position where the image is shifted, lighted pixels (colored pixels) are joined together and non-lighted pixels (solid-color pixels) are joined together, and this results in a change in density of the image at the position. As a result, it appears as a streaky noise extending in the sub-scanning direction at the position where the image is shifted.

Figure 11A:
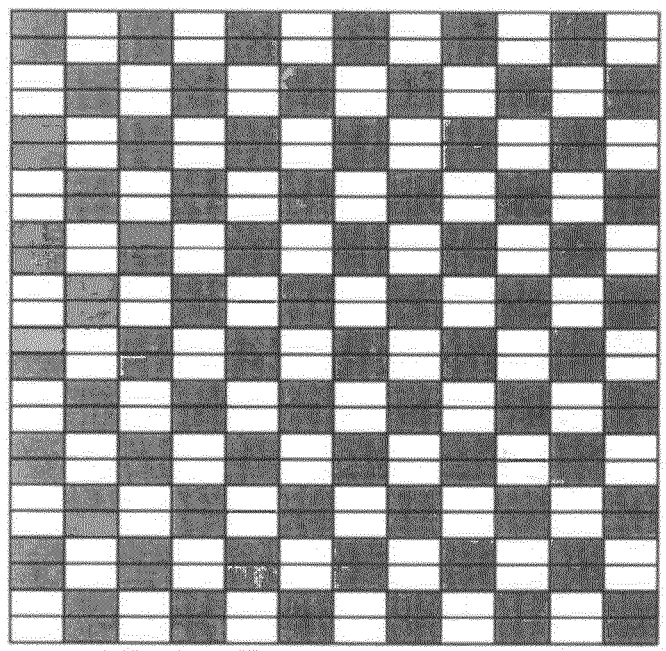
FIGS. 11A and 11B are diagrams showing a problem resolved by the skew correction according to the embodiment of the present invention.
Figure 11B:
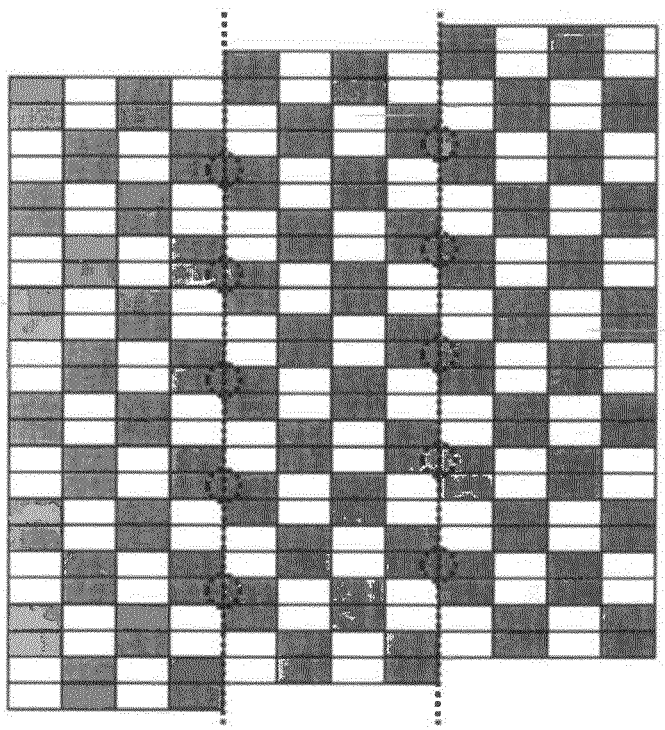

FIGS. 11A and 11B are diagrams showing an example where the sub-scanning direction resolution of an image is doubled and a shift amount in image shift is half the size of an original pixel to reduce a noise as described in FIG. 10B. In this case, as shown in FIG. 11A, to double the sub-scanning direction resolution of the image, a clock frequency for controlling the light-emission on/off control of the LEDA 281 is doubled, and the light-emission control unit 121 reads out pixel data of each main scanning line twice in a row at the time of readout of pixel data from the line memory 122. Namely, one main scanning line at the original resolution is drawn in twice batches.

Then, as shown in FIG. 11B, an amount of single shift in shift of an image in the sub-scanning direction is set to half the size of a pixel, and to obtain a shift amount corresponding to one pixel in total, the frequency of shift is set to twice as indicated by dotted lines in FIG. 11B. As a result, as indicated by dotted circles in FIG. 11B, respective areas of the joined lighted pixels and joined non-lighted pixels, which are joined together at the position where the image is shifted, are halved, and therefore, it is possible to suppress the effect on the vision such as that is recognized as a noise.

To obtain the effect as shown in FIG. 11B, as a general rule, the number of line memories for storing pixel information has to be increased according to a division number by which each main scanning line is divided. Furthermore, in the example shown in FIG. 11B, two-time shift is made, so it is necessary to increase the number of line memories to two. On the other hand, in the present embodiment, as described above with reference to FIG. 6, pixel information is read out from a single line memory more than once; thus, each main scanning line is divided into a plurality of sub-lines and the light emission control is performed sub-line by sub-line. Therefore, it is possible to prevent an increase in the number of line memories and eventually an increase in cost.

In the image forming apparatus 1 as described above, the optical writing device 111 according to the present embodiment increases the resolution of input image data, i.e., pixel information by the integral multiple, and divides each main scanning line into a plurality of sub-lines as described in FIG. 6 and draws an image on a per sub-line basis, thereby reducing a shift amount of the image in a single image shift to be equal to or smaller than the width of one pixel as described in FIGS. 11A and 11B. To achieve such processing with a simple configuration is the gist of the present embodiment. The operation of the optical writing device 111 according to the present embodiment is explained below.

Figure 12:
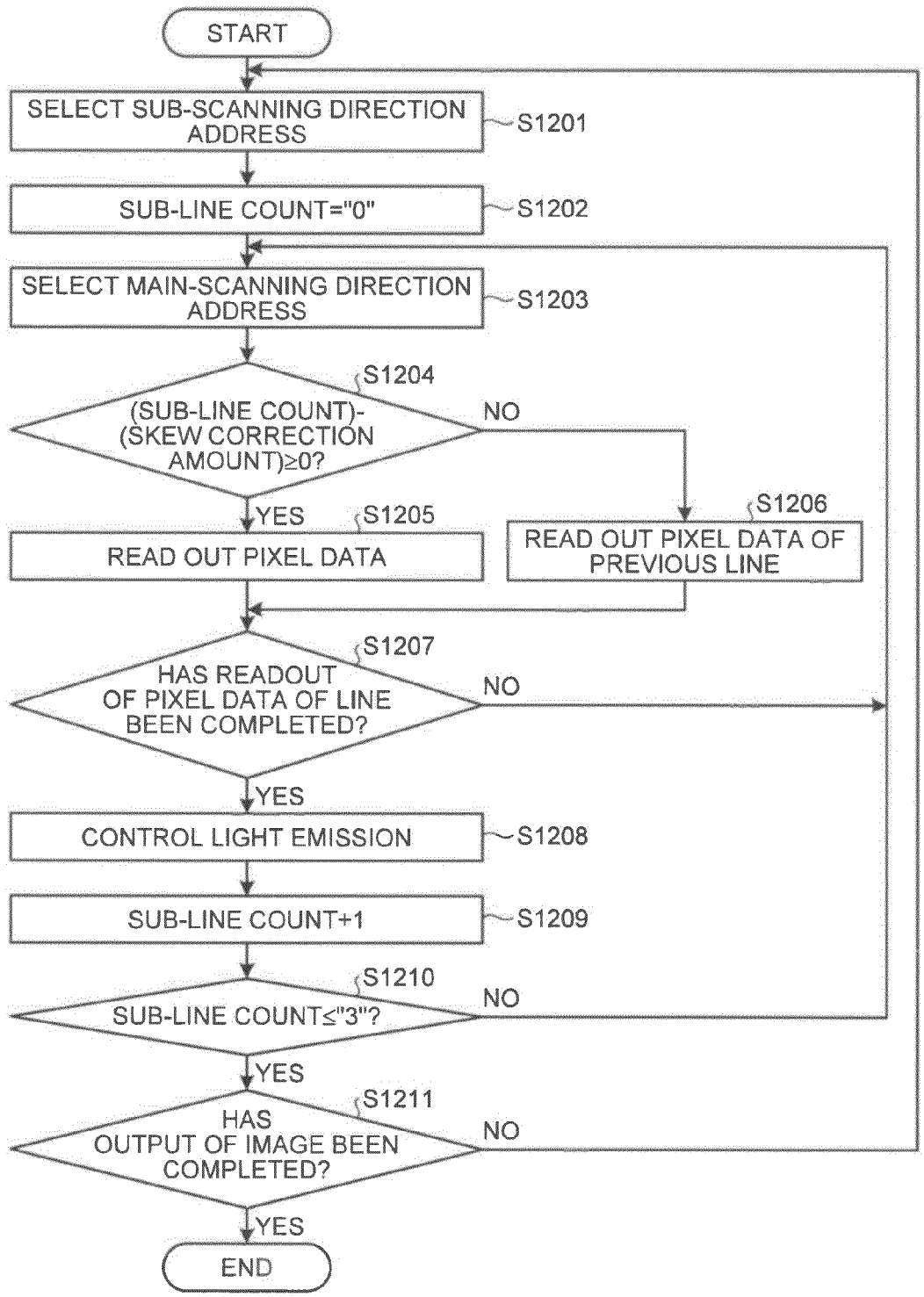
FIG. 12 is a flowchart showing the operation of a light-emission control unit according to the embodiment of the present invention.

FIG. 12 is a flowchart showing the operation of the optical-writing-device control unit 120 when the optical writing device 111 according to the present embodiment exposes the photosensitive drum 109 to a light and forms an electrostatic latent image. When drawing information has been input from the controller 20 of the image forming apparatus 1 to the optical-writing-device control unit 120 and the image-information acquiring unit 123 has stored pixel information in the line memory 122, the light-emission control unit 121 selects a sub-scanning direction address, i.e., an address specifying one main scanning line to read out pixel information from the line memory 122 in which pixel information of each main scanning line has been stored (Step S1201), and sets a sub-line count value to "0" (Step S1202). This starts readout of pixel information of the one main scanning line at the resolution of the pixel information.

The light-emission control unit 121 sequentially acquires pixel information of each main scanning line in the order from the head of an image to be output, and transfers the acquired pixel information to the LEDA 281. Therefore, at Step S1201, the light-emission control unit 121 sequentially selects an address specifying a main scanning line in the order from the first main scanning line to the last.

Then, the light-emission control unit 121 selects a main-scanning direction address, i.e., the order of a pixel in the one main scanning line (Step S1203). The light-emission control unit 121 sequentially acquires pixel information of a pixel in the order from the endmost pixel in each sub-line and transfers the acquired pixel information to the LEDA 281. Therefore, at Step S1203, the light-emission control unit 121 sequentially selects an address specifying the order of a pixel in the order from the endmost pixel.

After selecting the main-scanning direction address at Step S1203, the light-emission control unit 121 acquires a skew correction value as described in FIG. 7 on the basis of the selected addresses, and calculates a difference value calculated by subtracting the skew correction value from the sub-line count value (Step S1204). If the calculated difference value is zero or greater (YES at Step S1204), the light-emission control unit 121 reads out pixel data corresponding to the address selected at Step S1201 (Step S1205). On the other hand, if the difference value calculated at Step S1204 is a negative value (NO at Step S1204), the light-emission control unit 121 reads out pixel data corresponding to an address of a previous line of the line specified by the address selected at Step S1201 (Step S1206).

The light-emission control unit 121 repeats the operation at Steps S1203 to S1205 or S1206 until pixel information of an entire main-scanning direction range of the sub-line is read out (NO at Step S1207). Upon completion of readout of pixel information of the entire main-scanning direction range (YES at Step S1207), the light-emission control unit 121 controls light emission of the LEDA 281 in accordance with the read pixel information (Step S1208). When causing the LEDA 281 to emit a light, the light-emission control unit 121 increments the sub-line count value by one (Step S1209).

The light-emission control unit 121 repeats the operation at Steps S1203 to S1209 until the sub-line count value becomes "N" (NO at Step S1210). When the sub-line count value has become "N" (YES at Step S1210), whether output of the image to be output is completed is determined (Step S1211), and if it is not completed (NO at Step S1211), the process is repeated from Step S1201; if it has been completed (YES at Step S1211), the process is terminated.

Figure 13:
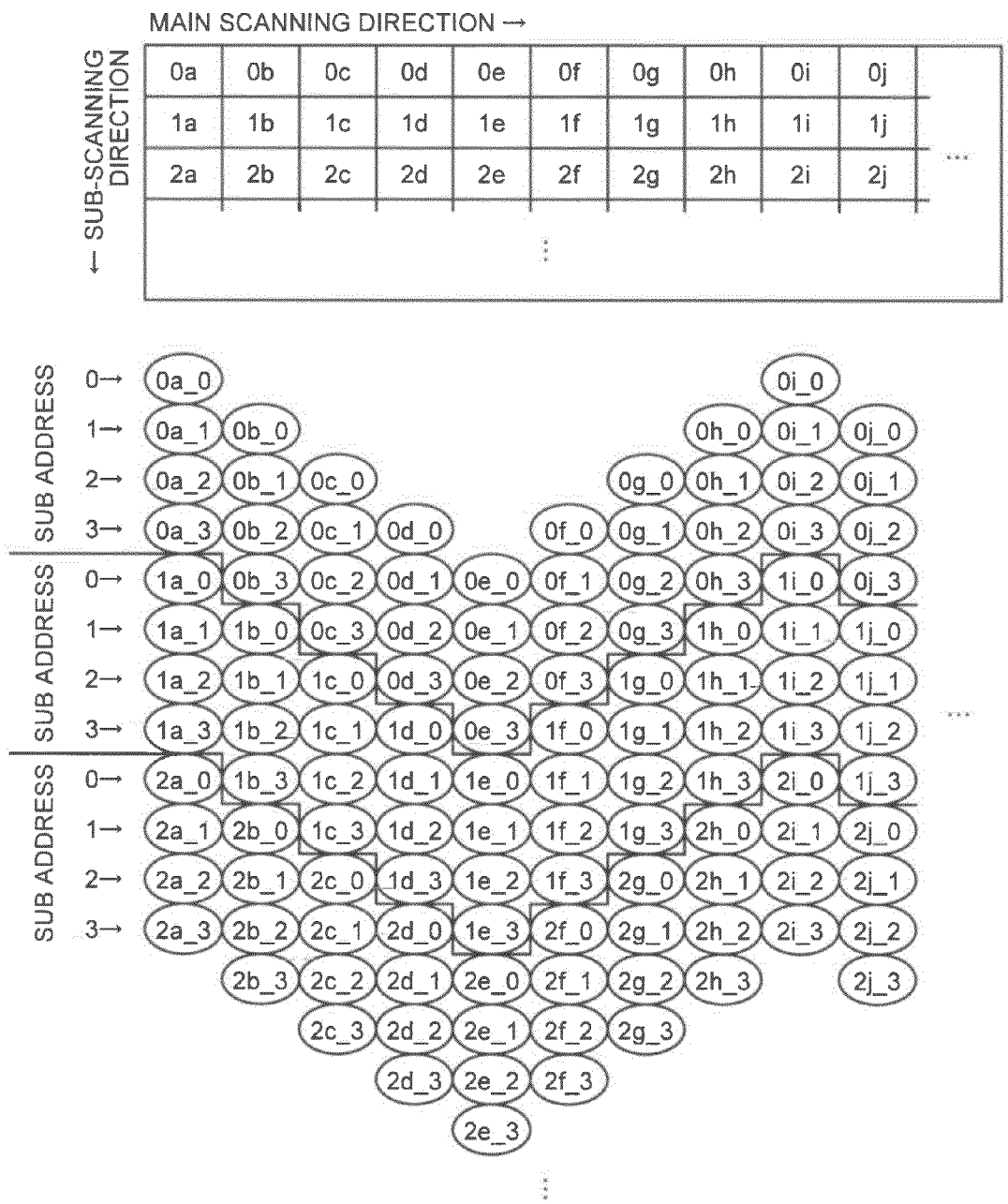
FIG. 13 is a diagram showing a relation between pixel information stored in the line memory and skew-corrected pixels to be output according to the embodiment of the present invention.

FIG. 13 shows an example of the image drawn through the process shown in FIG. 12. FIG. 13 is a diagram showing arrangement of pixels when the skew correction values shown in FIG. 7 are applied to the pixels arranged as shown in FIG. 6. As shown in FIG. 13, the pixels are shifted in the sub-scanning direction by the respective skew correction values. By performing the light emission control of the LEDA on the basis of such arrangement of the pixels, a suitable image of which the skew is corrected is formed even if the LEDA 281 is tilted.

Figure 14:
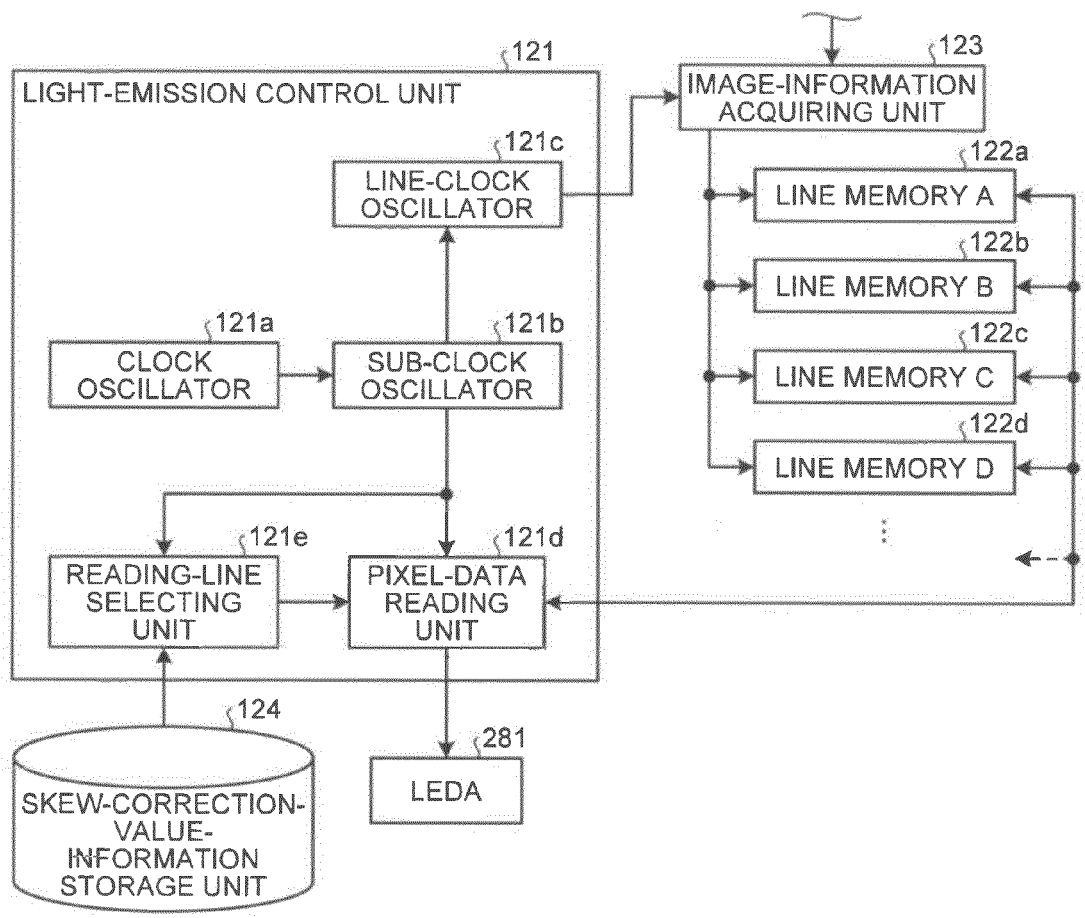
FIG. 14 is a diagram showing one form of detailed configuration of the optical-writing-device control unit according to the embodiment of the present invention.

Subsequently, a detailed configuration of the optical-writing-device control unit 120 according to the present embodiment is explained with reference to FIG. 14. As shown in FIG. 14, the light-emission control unit 121 according to the present embodiment includes a clock oscillator 121a, a sub-clock generating unit 121b, a line-clock generating unit 121c, a pixel-data reading unit 121d, and a reading-line selecting unit 121e.

The clock oscillator 121a oscillates a high-frequency clock. A clock signal of the clock oscillated by the clock oscillator 121a is a reference clock in the optical-writing-device control unit 120. The sub-clock generating unit 121b generates a sub-clock indicating the period of sub-lines shown in FIGS. 6 and 13, i.e., the period corresponding to four times as higher resolution as the resolution of original image data on the basis of the reference clock supplied from the clock oscillator 121a. The sub-clock generating unit 121b generates a sub-clock each time a count value of reference clocks supplied from the clock oscillator 121a becomes a predetermined count value, and outputs the generated sub-clock. This sub-clock period is the repetition period of Steps S1203 to S1210 in FIG. 12.

The line-clock generating unit 121c counts the sub-clock supplied from the sub-clock generating unit 121b, and generates a line clock indicating a main scanning line before being divided as shown in FIG. 6, i.e., the period corresponding to the resolution of original image data with each N counts. In the present embodiment, a multiple of the resolution is "4", so the line-clock generating unit 121c generates a line clock with each four sub-clock counts and outputs the generated line clock. This line-clock period is the repetition period of Steps S1201 to S1211 in FIG. 12.

The pixel-data reading unit 121d reads out pixel information stored in the line memory 122 on the basis of the sub-clock supplied from the sub-clock generating unit 121d. Namely, the pixel-data reading unit 121d performs the process at Step S1205 or S1206 in FIG. 12.

The pixel-data reading unit 121d is a pixel-information reading unit that determines a line memory from which pixel information is to be read out among a plurality of line memories 122a, 122b, 122c, 122d, . . . , which are denoted by line memory A, line memory B, line memory C, line memory D, . . . in FIG. 14, on the basis of a signal specifying a reading line which is supplied from the reading-line selecting unit 121e and reads out pixel information from the determined line memory.

The reading-line selecting unit 121e performs the process of selecting a sub-scanning direction address at Step S1201 in FIG. 12, and also performs the process of selecting a reading line according to a sub-line count value and a skew correction amount at Steps S1202 to S1204. The reading-line selecting unit 121e performs the reading-line selecting process with each sub-clock supplied from the sub-clock generating unit 121b, and outputs a signal specifying a line.

The line clock generated by the line-clock generating unit 121c is supplied to the image-information acquiring unit 123. The image-information acquiring unit 123 stores pixel information of each main scanning line sequentially in the line memories 122a, 122b, 122c, 122d, . . . on the basis of the line clock supplied from the line-clock generating unit 121c. For example, when there are eight line memories 122, the image-information acquiring unit 123 stores pixel information of each main scanning line sequentially in the line memories 122 in the order from the first line memory 122a, and when the image-information acquiring unit 123 stores pixel information in the eighth line memory 122, the next time, the image-information acquiring unit 123 writes pixel information over the pixel information in the first line memory A.

At Step S1201 in FIG. 12, the reading-line selecting unit 121e selects a sub-scanning direction address in the order from the line memory A, the line memory B, . . . . Then, when all the line memories 122 have been selected in the order from the line memory A, the line memory B, . . . , the order returns to the line memory A. This allows the reading-line selecting unit 121e to select a sub-scanning direction address in accordance with the storage order of the pixel information stored in the line memories 122 described above.

As described above, the process at Step S1201 is performed in accordance with the line clock. Therefore, the reading-line selecting unit 121e performs the process at Step S1201 with each N counts of sub-clocks supplied from the sub-clock generating unit 121b. Namely, the reading-line selecting unit 121e serves as a sub-line counting unit, and also selects a different main scanning line depending on the main-scanning direction position as a main scanning line of which the pixel information stored in the line memory 122 is to be read out on the basis of a value calculated from a count value of the sub-line period and a value of positional shift which is a skew correction value. Alternatively, it can be configured that a line clock is input to the reading-line selecting unit 121e and the reading-line selecting unit 121e performs the process at Step S1201 with each line clock.

Then, the reading-line selecting unit 121e performs the light emission control with respect to the selected sub-scanning direction address with each sub-line counts "0" to "3" at Steps S1202, S1209, and S1210, i.e., four times. At this time, at Step S1204, the reading-line selecting unit 121e subtracts a skew correction amount with respect to each pixel on the main scanning line from the sub-line count value, thereby determining whether pixel information to be read out is pixel information of a pixel on the currently-selected sub-scanning direction address.

For example, in the example shown in FIG. 13, it is assumed that addresses corresponding to 1a, 1b, 1c, . . . in FIG. 13 are selected as sub-scanning direction addresses. In this case, if a sub-line count value is "2", pixel information to be read out is pixel information of a line denoted by "1a_2" shown in the lower part of FIG. 13.

As shown in the lower part of FIG. 13, when main-scanning direction addresses are a, b, and c, pixels "1a_2", "1b_1", and "1c_0", i.e., pixels corresponding to the currently-selected sub-scanning direction address are read out. In this case, skew correction amounts of a, b, and c are, as shown in FIG. 7, "0", "1", and "2", respectively, and a value calculated by subtracting the skew correction amount from the sub-line count value is zero or greater.

On the other hand, when main-scanning direction addresses are d, e, and f, pixels "0d_3", "0e_2", and "0f_3", i.e., pixels on a sub-scanning direction address corresponding to a previous main scanning line just before the main scanning line corresponding to the currently-selected sub-scanning direction address are read out. In this case, skew correction amounts of d, e, and f are, as shown in FIG. 7, "3", "4", and "3", respectively, and a value calculated by subtracting the skew correction amount from the sub-line count value is a negative value. For example, if the currently-selected sub-scanning direction address is an address corresponding to the line memory B, when a main-scanning direction address is any of d, e, and f, pixel information is read out from the line memory A.

In this manner, the reading-line selecting unit 121e outputs a signal specifying a line memory from which pixel information is to be read out on the basis of a currently-selected sub-scanning direction address, a sub-line count value on the sub-scanning direction address, and a skew correction amount of each pixel in the main scanning direction.

Incidentally, by setting the number of line memories 122 to an integer power (hereinafter, referred to as the "m-th power") of two, the process at Step S1201 performed by the reading-line selecting unit 121e can be simplified. For example, in a case where the number of line memories 122 is "8" which is the cube of "2", as a counter which increments a count value by one with each N sub-clock counts, a 3-bit counter is mounted in the reading-line selecting unit 121e. Then, the reading-line selecting unit 121e performs the process at Step S1201 according to a value of the counter.

The counter, which increments a count value by one with each N sub-clock counts in the reading-line selecting unit 121e, counts in 3 bits, i.e., counts up values from 0 to 7, so a value of the counter returns to zero with each eight counts. Therefore, as for an address specified as a sub-scanning direction address, the same address is periodically specified with an 8-count period. Consequently, there is no need to perform the process of resetting the counter with each predetermined counts, so the process can be simplified.

Incidentally, in the case where the number of line memories 122 is eight as described above, the bit number of the counter does not always have to be "3" and just has to be "3" or greater. In this case, the reading-line selecting unit 121e can achieve the same effect as above by reference to lower 3 bits of the counter. Namely, when the number of line memories 122 is the m-th power of two, lower m bits are referenced.

Similarly, by setting the division number "N" by which each main scanning line is divided to an integer power (hereinafter, referred to as the "n-th power") of two, the process of returning from Step S1210 to Step S1202 can be simplified. In a case where "N" is "4" as described above, as a sub-clock counter, a 2-bit counter is mounted in the reading-line selecting unit 121e. Then, the reading-line selecting unit 121e performs the processes at Steps S1202 and S1210 according to a value of the counter.

The counter, which counts a sub-clock in the reading-line selecting unit 121e, counts in 2 bits, i.e., counts up values from 0 to 3, so a value of the counter returns to zero with each four counts. Therefore, a value of the counter becomes zero without execution of a special process as the process at Step S1202, and the process can be simplified. Incidentally, in this case, the process at Step S1210 is a process of determining whether a value of the counter is zero or not.

Furthermore, in the case where the division number "N" is "4", the bit number of the counter does not always have to be "2" and just has to be "2" or greater in the same manner as the case of the number of line memories described above. In this case, the reading-line selecting unit 121e can achieve the same effect as above by reference to lower 2 bits of the counter. Namely, when "N" is the n-th power of two, lower n bits are referenced.

Figure 15:
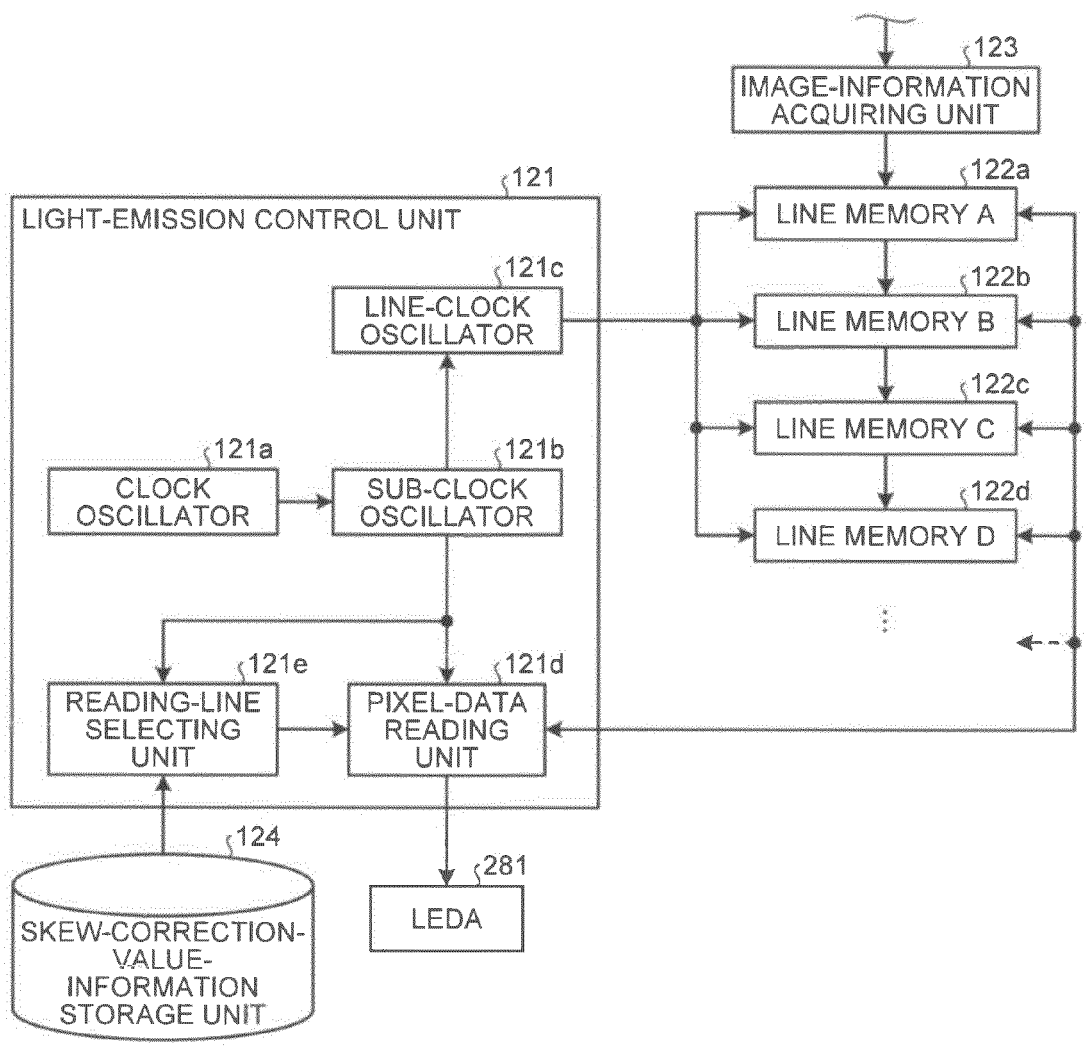
FIG. 15 is a diagram showing another form of detailed configuration of the optical-writing-device control unit according to the embodiment of the present invention.

FIG. 15 is a diagram showing different form from that is shown in FIG. 14 as a detailed configuration of the optical-writing-device control unit 120. In an example shown in FIG. 15, a process performed when the image-information acquiring unit 123 stores pixel information in the line memories 122 and a process of specifying an address on the basis of the process are different from the above.

In the present embodiment, a line clock generated by the line-clock generating unit 121c is supplied to the line memories 122. In accordance with the line clock, the line memory A stores therein pixel information acquired from the image-information acquiring unit 123 and the line memories B, C, D, . . . each store therein pixel information acquired from the preceding line memory. In the example shown in FIG. 15, image information acquired by the image-information acquiring unit 123 is input to the line memory A main scanning line by main scanning line, and is transferred to the subsequent line memory each time a line clock is supplied. Namely, the line memories 122 operate like a shift register.

In the example shown in FIG. 15, the latest pixel information is always stored in the line memory A; therefore, at Step S1210 in FIG. 12, a sub-scanning direction address corresponding to the line memory A is always selected. The other processes are identical to those in FIG. 14. Namely, in the example shown in FIG. 15, the reading-line selecting unit 121e selects a main scanning line of which the pixel information is to be read out on the basis of the arrangement sequence of storage media (line memories 122a, 122b, 122c, 122d, . . . in FIG. 15) provided with respect to each main scanning line in the line memories 122.

Incidentally, in the present embodiment, there is described an example where an upper limit of skew correction amount is equal to or less than "N", i.e., the division number by which each main scanning line at the resolution of an original image is divided. Thus, when a value calculated by subtracting a skew correction amount from a sub-line count value is a negative value, pixels of a previous main scanning line are always read out. However, it could be that a value greater than "N" has to be set as a skew correction amount.

In the case where a value greater than "N" is allowed as a skew correction amount, if a value calculated by subtracting the skew correction amount from a sub-line count value is a negative value, pixels of the last main scanning line but one or more may be read out. Therefore, when a value calculated by subtracting the skew correction amount from a sub-line count value is a negative value, the reading-line selecting unit 121e divides the value by "N", and calculates an absolute value of the whole number to which the quotient is rounded up. This value is a value indicating how many lines anterior to the many main scanning line, and pixels are to be read out from the many main scanning line identified by the value.

For example, in the case of FIG. 13, it is assumed that sub-scanning direction addresses are addresses corresponding to 1a, 1b, 1c, . . . and a sub-line count value is "2" in the same manner as above. In this case, when main-scanning direction addresses are d, e, and f, respective values calculated by subtracting skew correction amount from the sub-line count value are "−1", "−2", and "−1". These values divided by "N", i.e., "4" are "−0.25", "−0.5", and "−0.25", respectively, and absolute values of the whole numbers to which the quotients are rounded up are all "1"; thus, the reading-line selecting unit 121e selects a line memory corresponding to the previous main scanning line as a line memory from which pixel information is to be read out.

As explained above, by using the optical writing device according to the present embodiment, with a simple configuration, degradation of the image quality due to a change in dither pattern in skew correction performed in the optical writing device can be prevented.

Incidentally, in the above embodiment, there is described an example where sub-line counts is reset main scanning line by main scanning line by repetition of "0" to "3" as sub-line count values, i.e., "N" counts as shown in FIGS. 6 and 13 and Step S1210 of FIG. 12, and a main scanning line is switched each time the sub-line counts is reset. As another form, it can be configured to continue to count up sub-line counts. Such an example is explained with reference to FIGS. 16 and 17.

Figure 16:
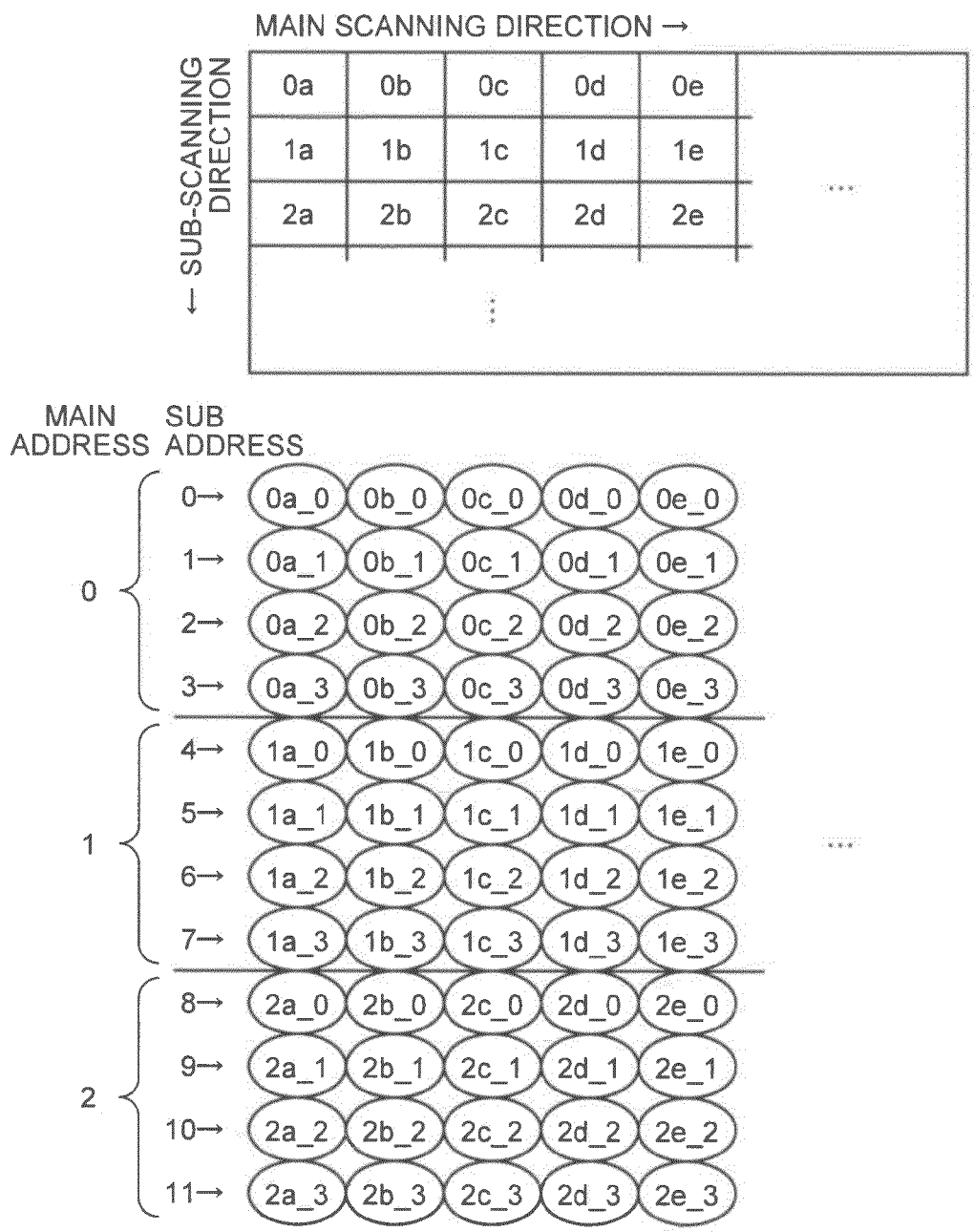
FIG. 16 is a diagram showing a relation between pixel information stored in the line memory and pixels to be output according to the embodiment of the present invention.

FIG. 16 is a diagram corresponding to FIG. 6 in the case of continuing to count sub-clocks. As shown in FIG. 16, the reading-line selecting unit 121e continues to count up a sub-clock count value as a "sub address". On the other hand, a "main address" is a sub-scanning direction address assigned in accordance with the order of main scanning lines of an image to be output.

Figure 17:
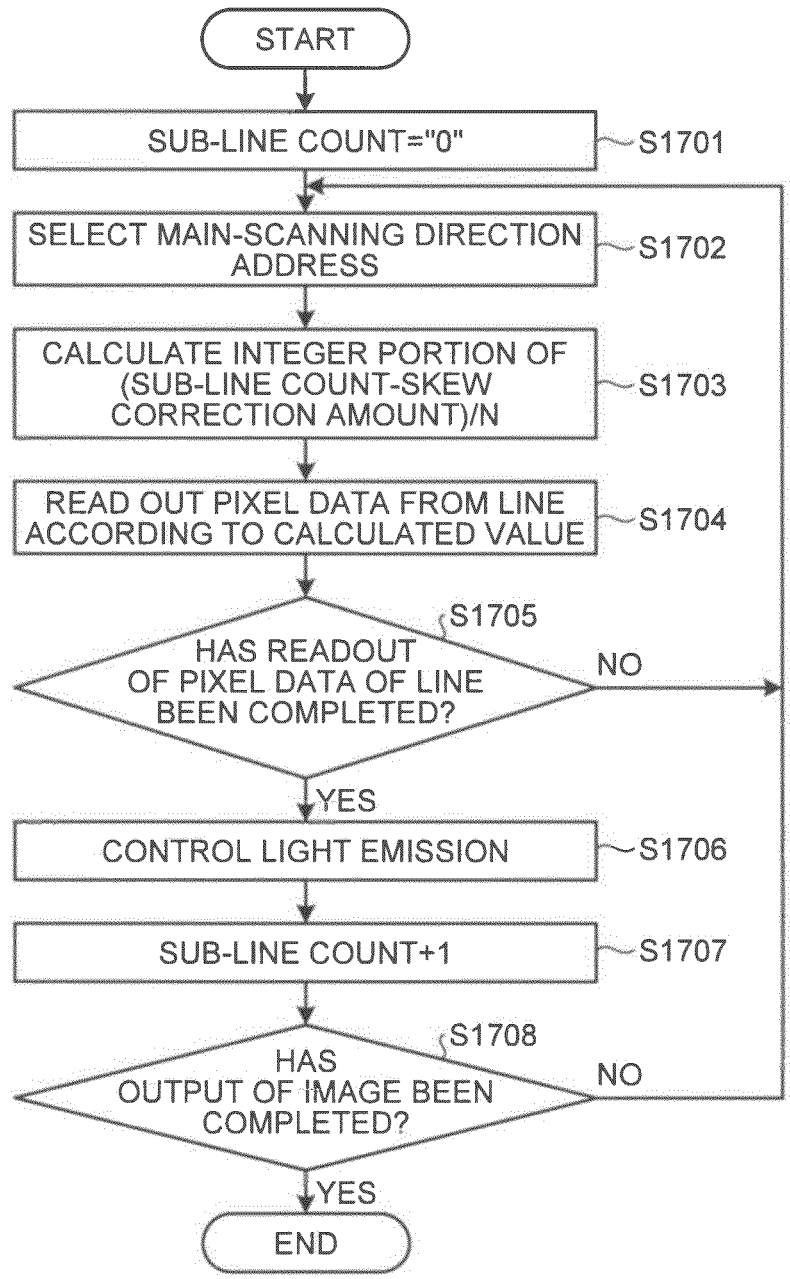
FIG. 17 is a flowchart showing the operation of the light-emission control unit according to another embodiment of the present invention.

FIG. 17 is a flowchart showing the operation of the optical-writing-device control unit 120 in the form shown in FIG. 16. When image information has been input from the controller 20 of the image forming apparatus 1 to the optical-writing-device control unit 120 and the image-information acquiring unit 123 has stored pixel information in the line memory 122, the reading-line selecting unit 121e resets a sub-line count value to zero (Step S1701), and selects a main-scanning direction address, i.e., the order of a pixel in one main scanning line (Step S1702).

After selecting the main-scanning direction address at Step S1702, the reading-line selecting unit 121e acquires a skew correction value as described in FIG. 7 on the basis of the selected address. Then, the reading-line selecting unit 121e obtains a difference value by subtracting the acquired skew correction value from the sub-line count value. Subsequently, the reading-line selecting unit 121e obtains an integer by rounding up a value calculated by dividing the difference value by N (Step S1703). This calculation is a calculation for obtaining a value of a main address corresponding to a sub address shown in FIG. 16. Namely, Step S1703 is a process for obtaining a main address in which a skew correction amount is taken into account on the basis of the sub-line count value. Upon completion of the process at Step S1703, the pixel-data reading unit 121d reads out pixel data from the corresponding line memory 122 with the value calculated at Step S1703 as a main address (Step S1704).

The light-emission control unit 121 repeats the operation at Steps S1702 to S1704 until pixel information of an entire main-scanning direction range of the sub-line is read out (NO at Step S1705). Upon completion of readout of pixel information of the entire main-scanning direction range (YES at Step S1705), the pixel-data reading unit 121d controls light emission of the LEDA 281 in accordance with the read pixel information (Step S1706). Then, the reading-line selecting unit 121e increments the sub-line count value by one (Step S1707).

The reading-line selecting unit 121e determines whether output of an image to be output has been completed, and if it is not completed (NO at Step S1708), the process is repeated from Step S1702; if it has been completed (YES at Step S1708), the process is terminated. In such a form, a difference in the process performed by the reading-line selecting unit 121e between the configurations shown in FIGS. 14 and 15 is explained.

In the configuration shown in FIG. 14, the reading-line selecting unit 121e stores therein a table showing a correspondence relation between a main address, i.e., a sub-scanning direction address assigned in accordance with the order of main scanning lines of an image to be output and a line memory 122a, 122b, 122c, 122d, etc. Then, the reading-line selecting unit 121e updates the table with each N sub-clock counts, i.e., each time new pixel information of a main scanning line is stored in the line memory 122 from the image-information acquiring unit 123.

Then, the reading-line selecting unit 121e calculates a main address in which a skew correction value is taken into account through the process at Step S1703 in FIG. 17, and determines a line memory 122 corresponding to the calculated value with reference to the table. The pixel-data reading unit 121d reads out pixel data from the line memory 122 on the basis of a result of the determination.

Incidentally, also in this case, by setting the number of line memories 122 to an integer power of two, the process can be simplified in the same manner as above. For example, when the number of line memories 122 is "8" which is the cube of 2, pixel information stored in each line memory 122 is rewritten to new pixel information with each eight line clocks. Therefore, as for a line memory 122 specified by the reading-line selecting unit 121e, the same line memory 122 is specified with each eight line clocks.

On the other hand, if the value calculated at Step S1703 is expressed in 2 bits, values of lower 8 bits show repetition of values of "0" to "7" in accordance with the increment of the sub-line count value. Therefore, if a table in which values of "0" to "7" are assigned to the eight line memories 122, respectively, is prepared, it can be achieved without update of the table as described above, and the process can be simplified.

Subsequently, a case of the configuration shown in FIG. 15 is explained. In this case, the reading-line selecting unit 121e includes a counter which increments a count value by one with each N counts of sub-clocks supplied, and holds the count value as a main address shown in FIG. 16. Then, the reading-line selecting unit 121e associates a value of the main address with the line memory A of the first order in the line memories 122, and associates the subsequent line memory with a value decremented by one with decreasing order in the line memories 122.

For example, when a count value of the counter which increments by one every N sub-clock counts is "2", the reading-line selecting unit 121e holds information that the line memory A is associated with an address "2", the line memory B is associated with an address "1", and the line memory C is associated with an address "0". In this case, pixel information stored in the line memory A is pixel information on the main address "2" shown in FIG. 16, pixel information stored in the line memory B is pixel information on the main address "1" shown in FIG. 16, and pixel information stored in the line memory C is pixel information on the main address "0" shown in FIG. 16.

In such a configuration, the reading-line selecting unit 121e performs a calculation at Step S1703, and thus can determine a line memory 122 associated with a calculated value and notify the pixel-data reading unit 121d of the line memory 122 as the one from which pixel information is to be read out.

Incidentally, in the case of employing the process shown in FIG. 17, in any of the configurations shown in FIGS. 14 and 15, by setting a value of "N", the division number by which each main scanning line is divided, to a value of the n-th power of two, which is an integer power of two, the process at Step S1703 can be simplified. In this case, a process of obtaining an integer portion of the quotient obtained by dividing a certain value by "N" is identical to a process of truncating lower "n" bits when the certain value is expressed in binary numbers.

Namely, when a value of "N", the division number by which each main scanning line is divided, is set to a value of the n-th power of two, which is an integer power of two, to complete the process at Step S1703, the reading-line selecting unit 121e only has to truncate lower "n" bits in a bit string that a value calculated by subtracting a skew correction value from a sub-line count value is expressed in binary numbers.

According to the present invention, it is possible to prevent degradation of the image quality due to a change in dither pattern in skew correction made in an optical writing device with a simple configuration.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical writing device that forms an electrostatic latent image on a photoreceptor, the optical writing device comprising:
   a pixel-information acquiring unit that acquires pixel information that is information about pixels that form an image as the electrostatic latent image;
   a line-pixel-information storage unit that stores the acquired pixel information corresponding to a plurality of lines for each main scanning line;
   a light source device that exposes the photoreceptor to a light to form the electrostatic latent image, the exposure with the light being performed with a period that corresponds to an N-fold sub-scanning direction resolution, the N-fold sub-scanning direction resolution being an integral multiple of a sub-scanning direction resolution of the pixel information;
   a positional-shift-information storage unit that stores a positional shift information in a sub-scanning direction that differs depending on a position in a main-scanning direction of the light source device;
   a sub-line counting unit that counts a sub-line period that corresponds to the N-fold sub-scanning direction resolution;
   a reading-line selecting unit that selects a main scanning line, as the main scanning line from which the pixel information is read out, that differs depending on the position in the main scanning direction, on the basis of a calculated value from the counted value of the sub-line period and the positional shift information; and
   a pixel-information reading unit that reads out the pixel information from the selected main scanning line and inputs the read pixel information to the light source device, wherein
   the reading-line selecting unit performs N times of selection that determines which main scanning line is to be selected as the main scanning line from which the pixel information is read out.

2. The optical writing device according to claim 1, wherein the reading-line selecting unit performs the N times of selection that determines which main scanning line is selected as the main scanning line from which the pixel information is read out by switching the main scanning line selected as the main scanning line from which the pixel information is read out every time when the sub-line period is counted N times.

3. The optical writing device according to claim 2, wherein N is the n-th power, which is an integer power, of two, and the reading-line selecting unit detects whether the sub-line period is counted N times every time when a lower n-bits count value of a counter becomes zero, the counter that counts the sub-line period at the sub-line counting unit.

4. The optical writing device according to claim 3, wherein the sub-line counting unit counts the sub-line period with an n-bit counter.

5. The optical writing device according to claim 1, wherein the reading-line selecting unit selects the main scanning line from which the pixel information is read out, on the basis of an integer portion of a value obtained by dividing the value calculated from the counted value of the sub-line period and the positional shift information by N.

6. The optical writing device according to claim 5, wherein N is the n-th power, which is an integer power, of two, and the sub-line counting unit obtains the integer portion of the value obtained by dividing the value calculated from the counted value of the sub-line period and the positional shift information by N by truncating lower n bits in a bit string, the bit string in which the value obtained by dividing the value calculated from the count value of the sub-line period and the positional shift information by N is expressed in binary numbers.

7. The optical writing device according to claim 1, wherein the line-pixel-information storage unit stores, sequentially for every main scanning line, the acquired pixel information into a plurality of storage media provided for every main scanning line, and,
when the pixel information is stored into all of the plurality of storage media provided for every main scanning line, the line-pixel-information storage unit stores new pixel information by overwriting the new pixel information on the previously stored pixel information sequentially.

8. The optical writing device according to claim 7, wherein the number of the plurality of storage media in the line-pixel-information storage unit is the m-th power, which is an integer power, of two, and
the reading-line selecting unit performs the selection that determines which main scanning line is to be selected as the main scanning line from which the pixel information is read out on the basis of a lower m-bits count value of a counter, the counter that counts a period that corresponds to N times the sub-line period, by switching the main scanning line selected as the main scanning line from which the pixel information is read out with the period that corresponds to N times the sub-line period.

9. The optical writing device according to claim 8, wherein the reading-line selecting unit counts the period that corresponds to N times the sub-line period with an m-bit counter.

10. The optical writing device according to claim 1, wherein the line-pixel-information storage unit stores the acquired pixel information into an uppermost storage medium of the plurality of the storage media arranged in series for each main scanning line, and transfer the pixel information from an upper storage medium to a lower storage medium sequentially.

11. The optical writing device according to claim 10, wherein the reading-line selecting unit determines which main scanning line is to be selected as the main scanning line from which the pixel information is read out, on the basis of an arrangement sequence of the plurality of storage media arranged in series for each main scanning line.

12. An image forming apparatus comprising the optical writing device according to claim 1.

13. A method for controlling an optical writing device including a light source device that exposes a photoreceptor to a light with a period that corresponds to an N-fold sub-scanning direction resolution, the N-fold sub-scanning direction resolution being an integral multiple of a sub-scanning direction resolution of pixel information of an image to be output, thereby forming an electrostatic latent image on the photoreceptor, the method comprising:
acquiring pixel information that is information about pixels that form an image as the electrostatic latent image;
storing the acquired pixel information into a storage medium in such a manner that the pixel information corresponding to a plurality of lines is stored for each main scanning line;
acquiring a positional shift value in a sub-scanning direction that differs depending on a position in a main-scanning direction of a light source device, from a positional-shift-information storage unit that stores a positional shift information in the sub-scanning direction that differs depending on the position in the main-scanning direction of the light source device;
acquiring a sub-line period count value from a counter that counts the sub-line period that corresponds to the N-fold sub-scanning direction resolution;
performing N times of selection that determines which main scanning line is selected as the main scanning line from which the stored pixel information is read out, on the basis of a calculated value from the sub-line period count value and the positional shift information; and
controlling light emission of the light source device by reading out the pixel information of the selected main scanning line and inputting the read pixel information to the light source device.

14. A computer program product comprising a non-transitory computer-readable medium having computer-readable program codes embodied in the medium for controlling an optical writing device including a light source device that exposes a photoreceptor to a light with a period that corresponds to an N-fold sub-scanning direction resolution, the N-fold sub-scanning direction resolution being an integral multiple of a sub-scanning direction resolution of the pixel information of an image to be output, thereby forming an electrostatic latent image on the photoreceptor, the program codes when executed causing a computer to execute:
acquiring pixel information that is information about pixels that form an image as the electrostatic latent image;
storing the acquired pixel information into a storage medium in such a manner that the pixel information corresponding to a plurality of lines is stored for each main scanning line;
acquiring a positional shift value in a sub-scanning direction that differs depending on a position in a main-scanning direction of a light source device, from a positional-shift-information storage unit that stores a positional shift information in the sub-scanning direction that differs depending on the position in the main-scanning direction of the light source device;
acquiring a sub-line period count value from a counter that counts the sub-line period that corresponds to the N-fold sub-scanning direction resolution;
performing N times of a selection that determines which main scanning line is selected as the main scanning line from which the stored pixel information is read out, on the basis of a calculated value from the sub-line period count value and the positional shift information; and
controlling light emission of the light source device by reading out the pixel information of the selected main scanning line and inputting the read pixel information to the light source device.

* * * * *